(12) United States Patent
Jeong et al.

(10) Patent No.: US 11,516,258 B2
(45) Date of Patent: Nov. 29, 2022

(54) I2NSF CAPABILITY YANG DATA MODEL

(71) Applicant: RESEARCH & BUSINESS FOUNDATION SUNGKYUNKWAN UNIVERSITY, Suwon-si (KR)

(72) Inventors: Jaehoon Jeong, Busan (KR); Jinyong Kim, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 0 days.

(21) Appl. No.: 16/938,781

(22) Filed: Jul. 24, 2020

(65) Prior Publication Data
US 2021/0029176 A1   Jan. 28, 2021

(30) Foreign Application Priority Data
Jul. 25, 2019 (KR) .......... 10-2019-0090539
Jul. 13, 2020 (KR) .......... 10-2020-0086467

(51) Int. Cl.
*H04L 9/40* (2022.01)
*H04L 29/06* (2006.01)

(52) U.S. Cl.
CPC .................. *H04L 63/205* (2013.01)

(58) Field of Classification Search
CPC ....... H04L 63/205; H04L 63/20; H04L 63/16; H04L 63/164; H04L 63/18; H04L 63/10; H04L 63/107; H04L 63/108
See application file for complete search history.

(56) References Cited

U.S. PATENT DOCUMENTS

2015/0106909 A1* 4/2015 Chen ............... H04L 63/029
726/12

OTHER PUBLICATIONS

Hares et al., I2NSF Capability YANG Data Model, Mar. 2018, Internet Engineering Task Force (IETF), pp. 1-62 Retrieved at: https://datatracker.ietf.org/doc/draft-hares-i2nsf-capability-data-model/07/ (Year: 2018).*

* cited by examiner

*Primary Examiner* — Edward Zee
(74) *Attorney, Agent, or Firm* — NSIP Law

(57) ABSTRACT

The present disclosure is a method for managing capabilities of network security functions (NSF) by a security controller in a security management system.

20 Claims, 45 Drawing Sheets

[FIG. 1]
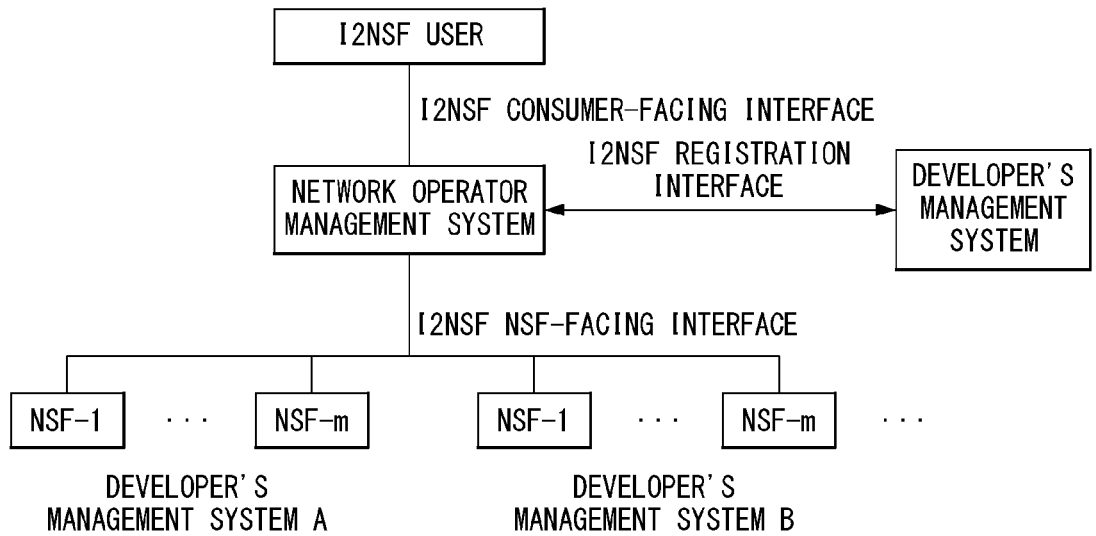
[FIG. 2]
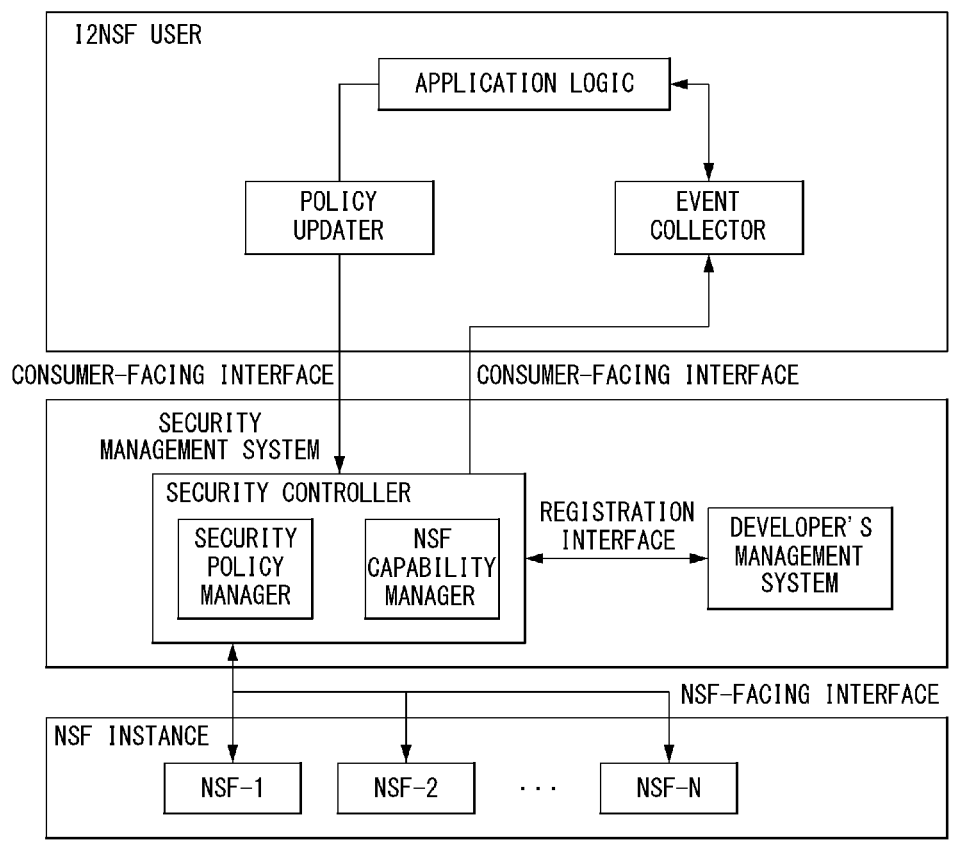

[FIG. 3]
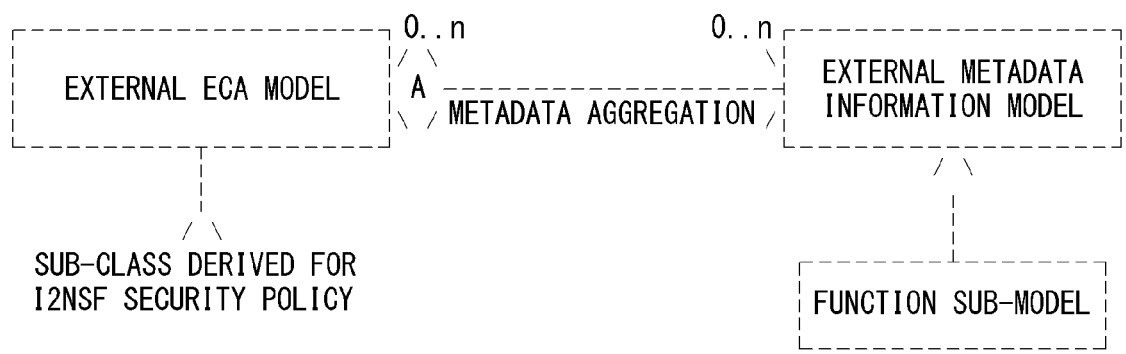
[FIG. 4]
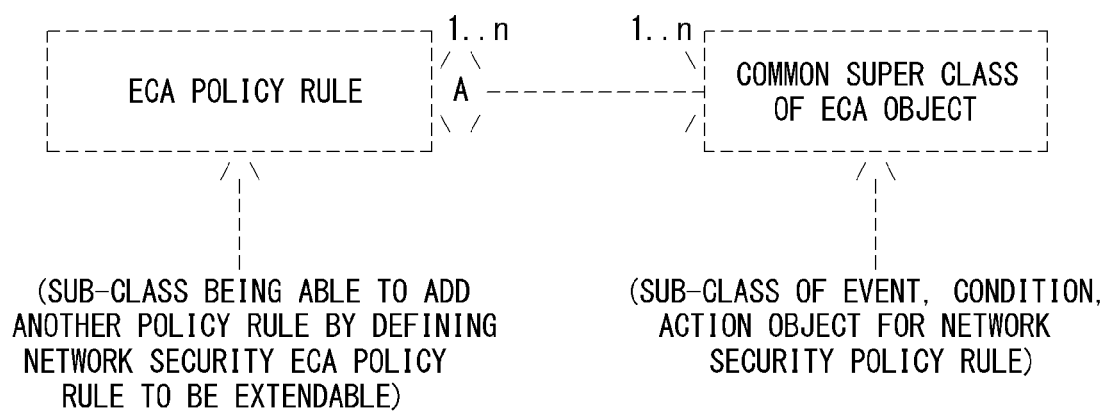

[FIG. 5]
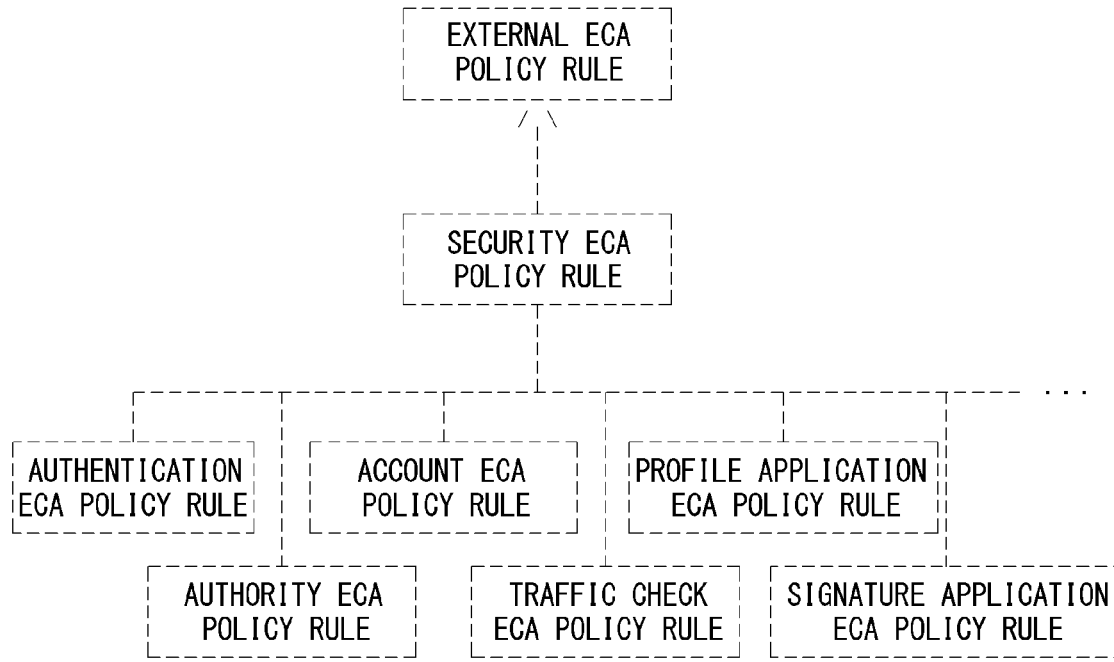
[FIG. 6]
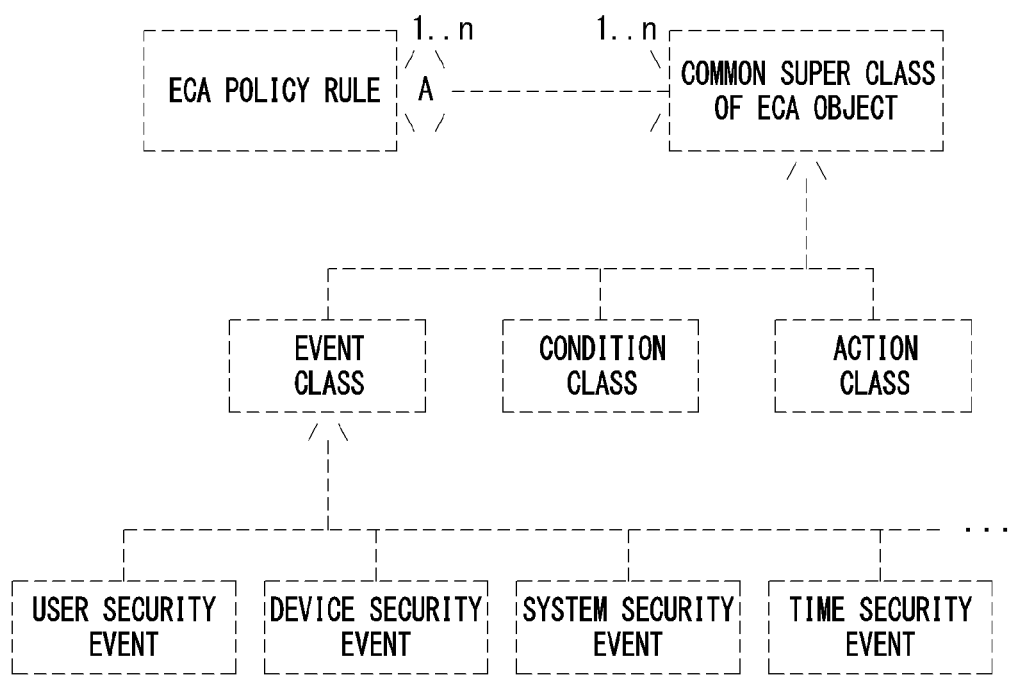

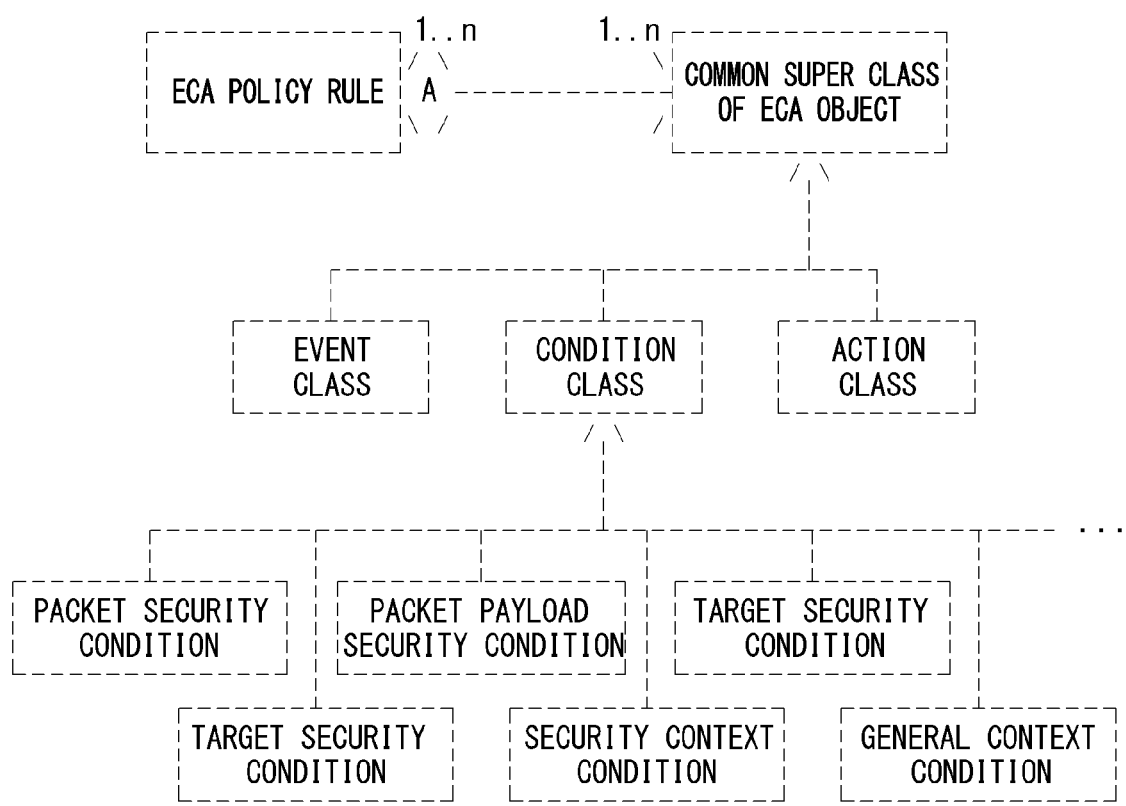
[FIG. 7]

[FIG. 8]
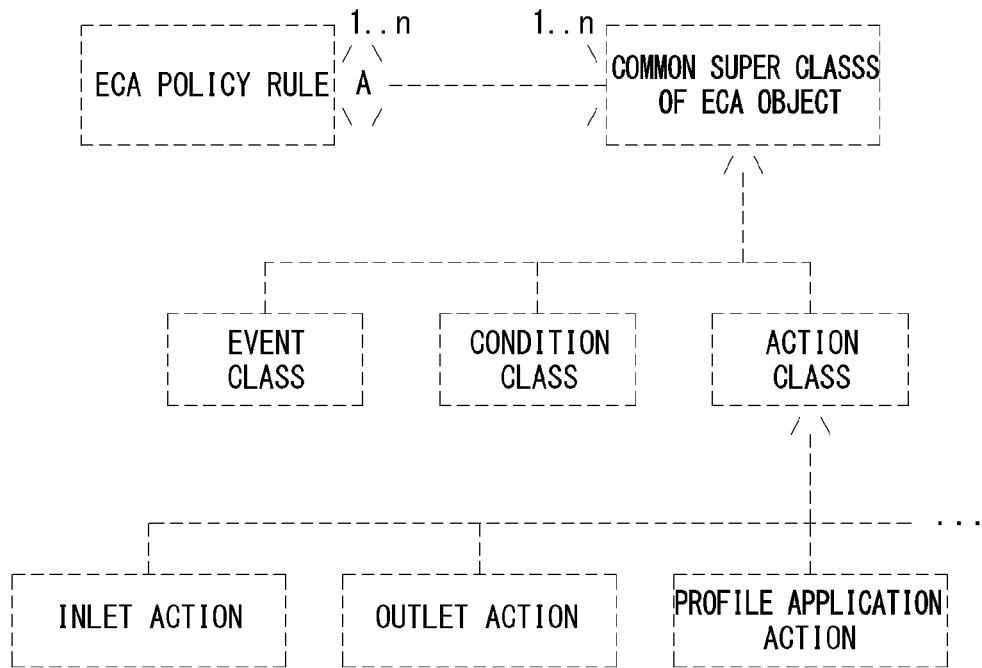
[FIG. 9]
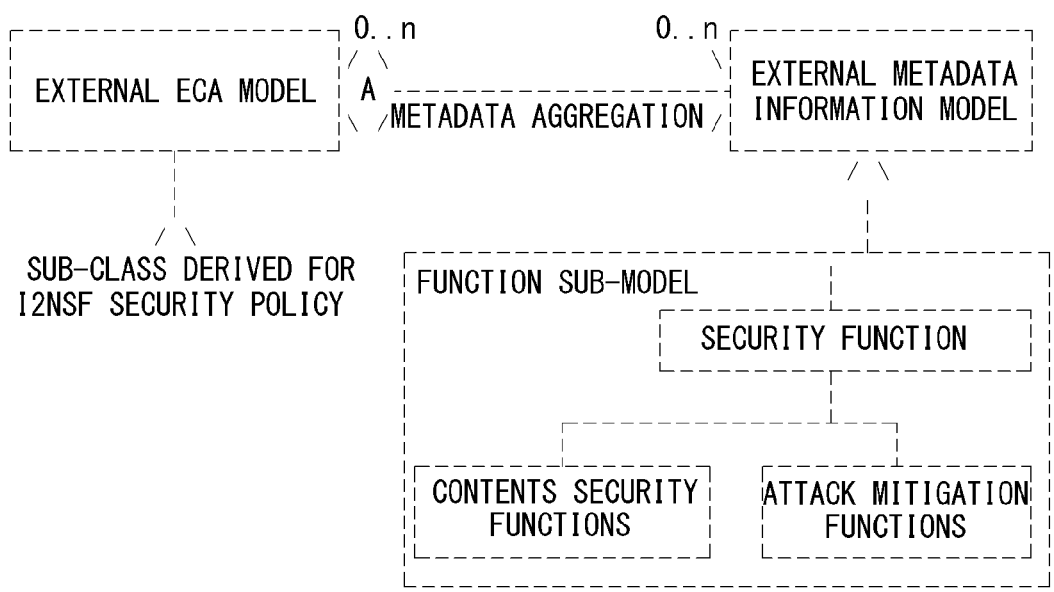

[FIG. 10]
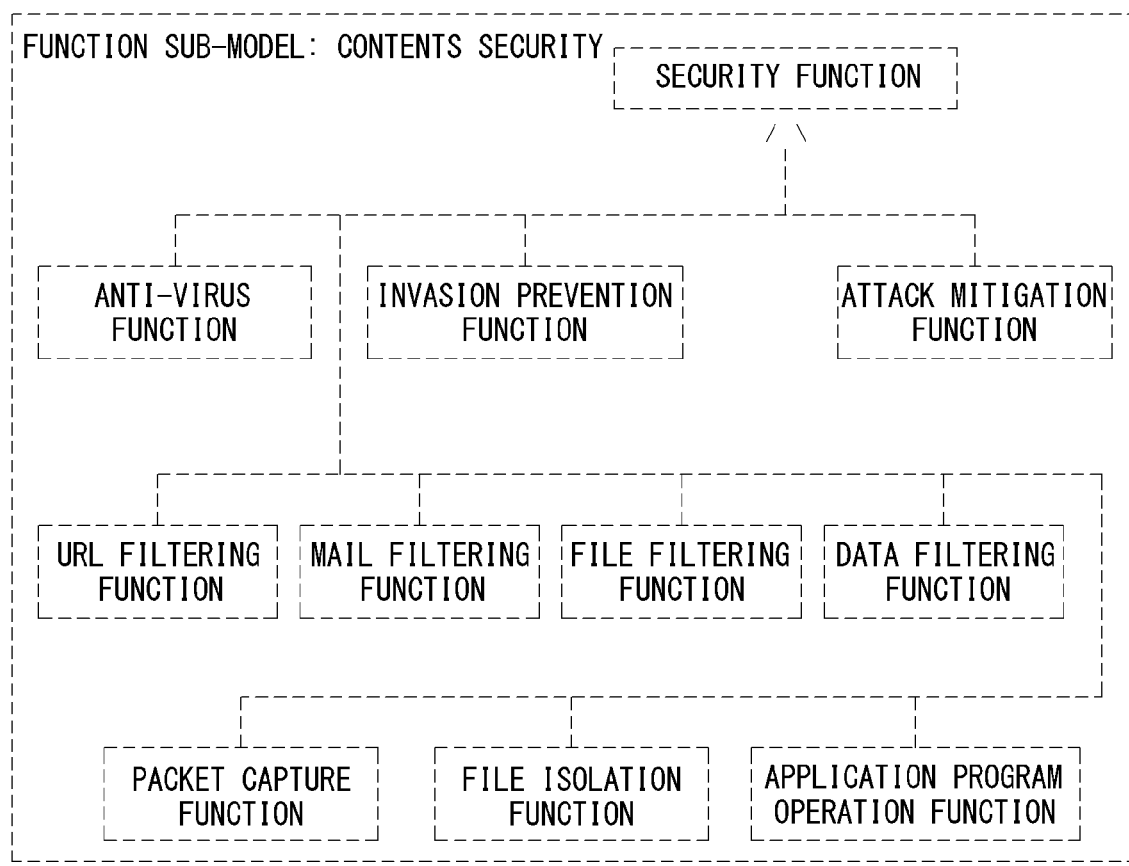

[FIG. 11]
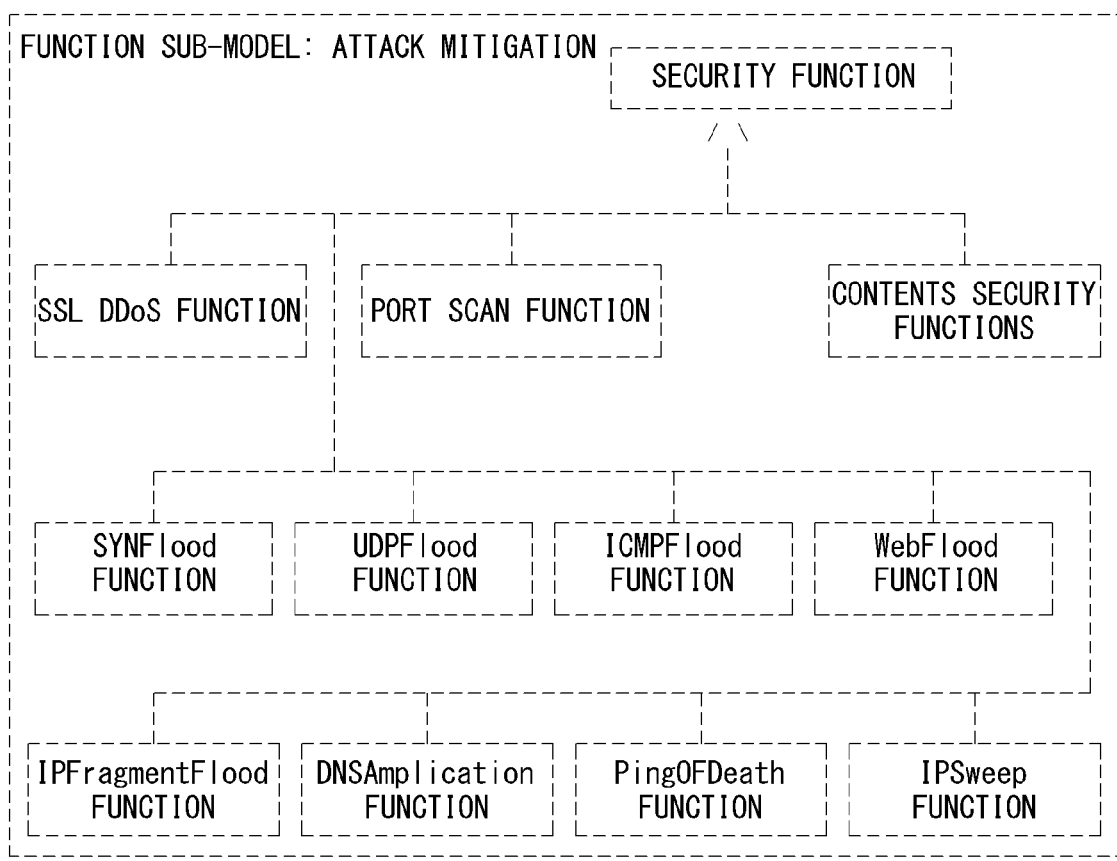

[FIG. 12]
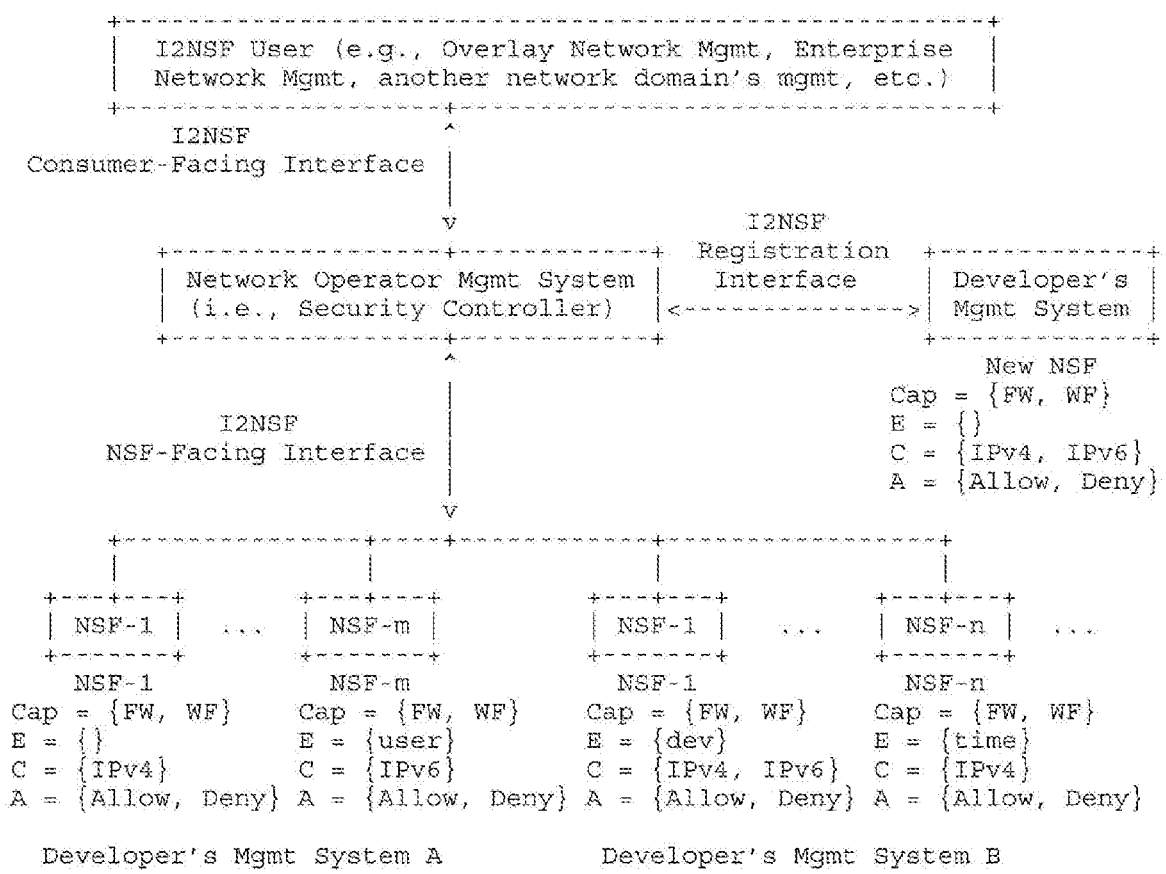

[FIG. 13]

```
module: ietf-i2nsf-capability
  +--rw nsf* [nsf-name]
     +--rw nsf-name                    string
     +--rw time-capabilities*                        enumeration
     +--rw event-capabilities
     |  +--rw system-event-capability*    identityref
     |  +--rw system-alarm-capability*    identityref
     +--rw condition-capabilities
     |  +--rw generic-nsf-capabilities
     |  |  +--rw ipv4-capability*     identityref
     |  |  +--rw icmp-capability*     identityref
     |  |  +--rw ipv6-capability*     identityref
     |  |  +--rw icmpv6-capability*   identityref
     |  |  +--rw tcp-capability*      identityref
     |  |  +--rw udp-capability*      identityref
     |  +--rw advanced-nsf-capabilities
     |  |  +--rw anti-virus-capability*     identityref
     |  |  +--rw anti-ddos-capability*      identityref
     |  |  +--rw ips-capability*            identityref
     |  |  +--rw url-capability*            identityref
     |  |  +--rw voip-volte-capability*     identityref
     |  +--rw context-capabilities*          identityref
     +--rw action-capabilities
     |  +--rw ingress-action-capability*    identityref
     |  +--rw egress-action-capability*     identityref
     |  +--rw log-action-capability*        identityref
     +--rw resolution-strategy-capabilities*    identityref
     +--rw default-action-capabilities*         identityref
     +--rw ipsec-method*                        identityref
```

【FIG. 14a】

```
<CODE BEGINS> file "ietf-i2nsf-capability@2020-07-13.yang"

module ietf-i2nsf-capability {
  yang-version 1.1;
  namespace
    "urn:ietf:params:xml:ns:yang:ietf-i2nsf-capability";
  prefix
    nsfcap;

organization
    "IETF I2NSF (Interface to Network Security Functions)
     Working Group";

contact
    "WG Web: <http://tools.ietf.org/wg/i2nsf>
     WG List: <mailto:i2nsf@ietf.org>

WG Chair: Linda Dunbar
     <mailto:ldunbar@futurewei.com>

WG Chair: Yoav Nir
     <mailto:ynir.ietf@gmail.com>

Editor: Susan Hares
     <mailto:shares@ndzh.com>

Editor: Jaehoon Paul Jeong
     <mailto:pauljeong@skku.edu>
```

[FIG. 14b]

```
    Editor: Jinyong Tim Kim
    <mailto:timkim@skku.edu>";

description
  "This module describes a capability model for I2NSF devices.

Copyright (c) 2020 IETF Trust and the persons identified as
  authors of the code.  All rights reserved.

Redistribution and use in source and binary forms, with or
  without modification, is permitted pursuant to, and subject
  to the license terms contained in, the Simplified BSD License
  set forth in Section 4.c of the IETF Trust's Legal Provisions
  Relating to IETF Documents
  (http://trustee.ietf.org/license-info).

This version of this YANG module is part of RFC 8341; see
  the RFC itself for full legal notices.";

revision "2020-07-13"{
  description "Initial revision.";
  reference
    "RFC XXXX: I2NSF Capability YANG Data Model";
}

/*
 * Identities
 */ identity event {
  description
    "Base identity for I2NSF policy events.";
  reference
    "draft-ietf-i2nsf-nsf-monitoring-data-model-03
     - Event";
} identity system-event-capability {
  base event;
  description
    "Identity for system events";
  reference
    "draft-ietf-i2nsf-nsf-monitoring-data-model-03
     - System alarm";
} identity system-alarm-capability {
  base event;
```

[FIG. 14c]

```
  description
    "Identity for system alarms";
  reference
    "draft-ietf-i2nsf-nsf-monitoring-data-model-03
    - System alarm";
} identity access-violation {
  base system-event-capability;
  description
    "Identity for access violation events";
  reference
    "draft-ietf-i2nsf-nsf-monitoring-data-model-03
    - System event";
} identity configuration-change {
  base system-event-capability;
  description
    "Identity for configuration change events";
  reference
    "draft-ietf-i2nsf-nsf-monitoring-data-model-03
    - System event";
} identity memory-alarm {
  base system-alarm-capability;
  description
    "Identity for memory alarm events";
  reference
    "draft-ietf-i2nsf-nsf-monitoring-data-model-03
    - System alarm";
} identity cpu-alarm {
  base system-alarm-capability;
  description
    "Identity for CPU alarm events";
  reference
    "draft-ietf-i2nsf-nsf-monitoring-data-model-03
    - System alarm";
} identity disk-alarm {
  base system-alarm-capability;
  description
    "Identity for disk alarm events";
  reference
```

【FIG. 14d】

```
      "draft-ietf-i2nsf-nsf-monitoring-data-model-03
      - System alarm";
} identity hardware-alarm {
  base system-alarm-capability;
  description
    "Identity for hardware alarm events";
  reference
    "draft-ietf-i2nsf-nsf-monitoring-data-model-03
    - System alarm";
} identity interface-alarm {
  base system-alarm-capability;
  description
    "Identity for interface alarm events";
  reference
    "draft-ietf-i2nsf-nsf-monitoring-data-model-03
    - System alarm";
} identity condition {
  description
    "Base identity for policy conditions";
} identity context-capability {
  base condition;
  description
    "Identity for context condition capabilities";
} identity acl-number {
  base context-capability;
  description
    "Identity for ACL number condition capability";
} identity application {
  base context-capability;
  description
    "Identity for application condition capability";
} identity target {
  base context-capability;
  description
```

[FIG. 14e]

```
    "Identity for target condition capability";
} identity user {
  base context-capability;
  description
    "Identity for user condition capability";
} identity group {
  base context-capability;
  description
    "Identity for group condition capability";
} identity geography {
  base context-capability;
  description
    "Identity for geography condition capability";
} identity ipv4-capability {
  base condition;
  description
    "Identity for IPv4 condition capabilities";
  reference
    "RFC 791: Internet Protocol";
} identity exact-ipv4-header-length {
  base ipv4-capability;
  description
    "Identity for exact-match IPv4 header-length
    condition capability";
  reference
    "RFC 791: Internet Protocol - Header Length";
} identity range-ipv4-header-length {
  base ipv4-capability;
  description
    "Identity for range-match IPv4 header-length
    condition capability";
  reference
    "RFC 791: Internet Protocol - Header Length";
} identity ipv4-tos {
```

[FIG. 14f]

```
  base ipv4-capability;
  description
    "Identity for IPv4 Type-Of-Service (TOS)
    condition capability";
  reference
    "RFC 791: Internet Protocol - Type of Service";
} identity exact-ipv4-total-length {
  base ipv4-capability;
  description
    "Identity for exact-match IPv4 total length
    condition capability";
  reference
    "RFC 791: Internet Protocol - Total Length";
} identity range-ipv4-total-length {
  base ipv4-capability;
  description
    "Identity for range-match IPv4 total length
    condition capability";
  reference
    "RFC 791: Internet Protocol - Total Length";
} identity ipv4-id {
  base ipv4-capability;
  description
    "Identity for identification condition capability";
  reference
    "RFC 791: Internet Protocol - Identification";
} identity ipv4-fragment-flags {
  base ipv4-capability;
  description
    "Identity for IPv4 fragment flags condition capability";
  reference
    "RFC 791: Internet Protocol - Fragmentation Flags";
} identity exact-ipv4-fragment-offset {
  base ipv4-capability;
  description
    "Identity for exact-match IPv4 fragment offset
    condition capability";
  reference
```

[FIG. 14g]

```
    "RFC 791: Internet Protocol - Fragmentation Offset";
} identity range-ipv4-fragment-offset {
  base ipv4-capability;
  description
    "Identity for range-match IPv4 fragment offset
    condition capability";
  reference
    "RFC 791: Internet Protocol - Fragmentation Offset";
} identity exact-ipv4-ttl {
  base ipv4-capability;
  description
    "Identity for exact-match IPv4 Time-To-Live (TTL)
    condition capability";
  reference
    "RFC 791: Internet Protocol - Time To Live (TTL)";
} identity range-ipv4-ttl {
  base ipv4-capability;
  description
    "Identity for range-match IPv4 Time-To-Live (TTL)
    condition capability";
  reference
    "RFC 791: Internet Protocol - Time To Live (TTL)";
} identity ipv4-protocol {
  base ipv4-capability;
  description
    "Identity for IPv4 protocol condition capability";
  reference
    "RFC 790: Assigned numbers - Assigned Internet
     Protocol Number
     RFC 791: Internet Protocol - Protocol";
} identity exact-ipv4-address {
  base ipv4-capability;
  description
    "Identity for exact-match IPv4 address
    condition capability";
  reference
    "RFC 791: Internet Protocol - Address";
}
```

[FIG. 14h]

```
identity range-ipv4-address {
  base ipv4-capability;
  description
    "Identity for range-match IPv4 address condition
     capability";
  reference
    "RFC 791: Internet Protocol - Address";
} identity ipv4-ip-opts {
  base ipv4-capability;
  description
    "Identity for IPv4 option condition capability";
  reference
    "RFC 791: Internet Protocol - Options";
} identity ipv4-geo-ip {
  base ipv4-capability;
  description
    "Identity for geography condition capability";
  reference
    "draft-ietf-i2nsf-capability-05: Information Model
     of NSFs Capabilities - Geo-IP";
} identity ipv6-capability {
  base condition;
  description
    "Identity for IPv6 condition capabilities";
  reference
    "RFC 8200: Internet Protocol, Version 6 (IPv6)
     Specification";
} identity ipv6-traffic-class {
  base ipv6-capability;
  description
    "Identity for IPv6 traffic class
     condition capability";
  reference
    "RFC 8200: Internet Protocol, Version 6 (IPv6)
     Specification - Traffic Class";
} identity exact-ipv6-flow-label {
  base ipv6-capability;
  description
```

[FIG. 14i]

```
    "Identity for exact-match IPv6 flow label
    condition capability";
  reference
    "RFC 8200: Internet Protocol, Version 6 (IPv6)
    Specification - Flow Label";
} identity range-ipv6-flow-label {
  base ipv6-capability;
  description
    "Identity for range-match IPv6 flow label
    condition capability";
  reference
    "RFC 8200: Internet Protocol, Version 6 (IPv6)
    Specification - Flow Label";
} identity exact-ipv6-payload-length {
  base ipv6-capability;
  description
    "Identity for exact-match IPv6 payload length
    condition capability";
  reference
    "RFC 8200: Internet Protocol, Version 6 (IPv6)
    Specification - Payload Length";
} identity range-ipv6-payload-length {
  base ipv6-capability;
  description
    "Identity for range-match IPv6 payload length
    condition capability";
  reference
    "RFC 8200: Internet Protocol, Version 6 (IPv6)
    Specification - Payload Length";
} identity ipv6-next-header {
  base ipv6-capability;
  description
    "Identity for IPv6 next header condition capability";
  reference
    "RFC 8200: Internet Protocol, Version 6 (IPv6)
    Specification - Next Header";
} identity exact-ipv6-hop-limit {
  base ipv6-capability;
```

[FIG. 14j]

```
description
  "Identity for exact-match IPv6 hop limit condition
  capability";
reference
  "RFC 8200: Internet Protocol, Version 6 (IPv6)
  Specification - Hop Limit";
} identity range-ipv6-hop-limit {
  base ipv6-capability;
  description
    "Identity for range-match IPv6 hop limit condition
    capability";
  reference
    "RFC 8200: Internet Protocol, Version 6 (IPv6)
    Specification - Hop Limit";
} identity exact-ipv6-address {
  base ipv6-capability;
  description
    "Identity for exact-match IPv6 address condition
     capability";
  reference
    "RFC 8200: Internet Protocol, Version 6 (IPv6)
    Specification - Address";
} identity range-ipv6-address {
  base ipv6-capability;
  description
    "Identity for range-match IPv6 address condition
    capability";
  reference
    "RFC 8200: Internet Protocol, Version 6 (IPv6)
    Specification - Address";
} identity tcp-capability {
  base condition;
  description
    "Identity for TCP condition capabilities";
  reference
    "RFC 793: Transmission Control Protocol";
} identity exact-tcp-port-num {
  base tcp-capability;
```

[FIG. 14k]

```
  description
    "Identity for exact-match TCP port number condition
     capability";
  reference
    "RFC 793: Transmission Control Protocol - Port Number";
} identity range-tcp-port-num {
  base tcp-capability;
  description
    "Identity for range-match TCP port number condition
     capability";
  reference
    "RFC 793: Transmission Control Protocol - Port Number";
} identity exact-tcp-seq-num {
  base tcp-capability;
  description
    "Identity for exact-match TCP sequence number condition
     capability";
  reference
    "RFC 793: Transmission Control Protocol - Sequence Number";
} identity range-tcp-seq-num {
  base tcp-capability;
  description
    "Identity for range-match TCP sequence number condition
     capability";
  reference
    "RFC 793: Transmission Control Protocol - Sequence Number";
} identity exact-tcp-ack-num {
  base tcp-capability;
  description
    "Identity for exact-match TCP acknowledgement number condition
     capability";
  reference
    "RFC 793: Transmission Control Protocol - Acknowledgement Number";
} identity range-tcp-ack-num {
  base tcp-capability;
  description
    "Identity for range-match TCP acknowledgement number condition
     capability";
```

[FIG. 14I]

```
  reference
    "RFC 793: Transmission Control Protocol - Acknowledgement Number";
} identity exact-tcp-window-size {
  base tcp-capability;
  description
    "Identity for exact-match TCP window size condition capability";
  reference
    "RFC 793: Transmission Control Protocol - Window Size";
} identity range-tcp-window-size {
  base tcp-capability;
  description
    "Identity for range-match TCP window size condition capability";
  reference
    "RFC 793: Transmission Control Protocol - Window Size";
} identity tcp-flags {
  base tcp-capability;
  description
    "Identity for TCP flags condition capability";
  reference
    "RFC 793: Transmission Control Protocol - Flags";
} identity udp-capability {
  base condition;
  description
    "Identity for UDP condition capabilities";
  reference
    "RFC 768: User Datagram Protocol";
} identity exact-udp-port-num {
  base udp-capability;
  description
    "Identity for exact-match UDP port number condition capability";
  reference
    "RFC 768: User Datagram Protocol - Port Number";
} identity range-udp-port-num {
  base udp-capability;
  description
    "Identity for range-match UDP port number condition capability";
```

【FIG. 14m】

```
  reference
    "RFC 768: User Datagram Protocol - Port Number";
} identity exact-udp-total-length {
  base udp-capability;
  description
    "Identity for exact-match UDP total-length condition capability";
  reference
    "RFC 768: User Datagram Protocol - Total Length";
} identity range-udp-total-length {
  base udp-capability;
  description
    "Identity for range-match UDP total-length condition capability";
  reference
    "RFC 768: User Datagram Protocol - Total Length";
} identity icmp-capability {
  base condition;
  description
    "Identity for ICMP condition capabilities";
  reference
    "RFC 792: Internet Control Message Protocol";
} identity icmp-type {
  base icmp-capability;
  description
    "Identity for ICMP type condition capability";
  reference
    "RFC 792: Internet Control Message Protocol";
} identity icmpv6-capability {
  base condition;
  description
    "Identity for ICMPv6 condition capabilities";
  reference
    "RFC 4443: Internet Control Message Protocol (ICMPv6)
     for the Internet Protocol Version 6 (IPv6) Specification
     - ICMPv6";
} identity icmpv6-type {
  base icmpv6-capability;
```

【FIG. 14n】

```
  description
    "Identity for ICMPv6 type condition capability";
  reference
    "RFC 4443: Internet Control Message Protocol (ICMPv6)
     for the Internet Protocol Version 6 (IPv6) Specification
     - ICMPv6";
} identity url-capability {
  base condition;
  description
    "Identity for URL condition capabilities";
} identity pre-defined {
  base url-capability;
  description
    "Identity for URL pre-defined condition capabilities";
} identity user-defined {
  base url-capability;
  description
    "Identity for URL user-defined condition capabilities";
} identity log-action-capability {
  description
    "Identity for log-action capabilities";
} identity rule-log {
  base log-action-capability;
  description
    "Identity for rule log log-action capability";
} identity session-log {
  base log-action-capability;
  description
    "Identity for session log log-action capability";
} identity ingress-action-capability {
  description
    "Identity for ingress-action capabilities";
  reference
    "RFC 8329: Framework for Interface to Network Security
```

[FIG. 14o]

```
      Functions - Ingress action";
} identity egress-action-capability {
  description
    "Base identity for egress-action capabilities";
  reference
    "RFC 8329: Framework for Interface to Network Security
    Functions - Egress action";
} identity default-action-capability {
  description
    "Identity for default-action capabilities";
  reference
    "draft-ietf-i2nsf-capability-05: Information Model of
    NSFs Capabilities - Default action";
} identity pass {
  base ingress-action-capability;
  base egress-action-capability;
  base default-action-capability;
  description
    "Identity for pass action capability";
  reference
    "RFC 8329: Framework for Interface to Network Security
    Functions - Ingress, egress, and pass actions
         draft-ietf-i2nsf-capability-05: Information Model of
    NSFs Capabilities - Actions and default action";
} identity drop {
  base ingress-action-capability;
  base egress-action-capability;
  base default-action-capability;
  description
    "Identity for drop action capability";
  reference
    "RFC 8329: Framework for Interface to Network Security
    Functions - Ingress, egress, and drop actions
    draft-ietf-i2nsf-capability-05: Information Model of
    NSFs Capabilities - Actions and default action";
} identity alert {
  base ingress-action-capability;
  base egress-action-capability;
```

[FIG. 14p]

```
  base default-action-capability;
  description
    "Identity for alert action capability";
  reference
    "RFC 8329: Framework for Interface to Network Security
     Functions - Ingress, egress, and alert actions
     draft-ietf-i2nsf-nsf-monitoring-data-model-03: I2NSF
     NSF Monitoring YANG Data Model - Alarm (i.e., alert)
     draft-ietf-i2nsf-capability-05: Information Model of
     NSFs Capabilities - Actions and default action";
} identity mirror {
  base ingress-action-capability;
  base egress-action-capability;
  base default-action-capability;
  description
    "Identity for mirror action capability";
  reference
    "RFC 8329: Framework for Interface to Network Security
     Functions - Ingress, egress, and mirror actions
     draft-ietf-i2nsf-capability-05: Information Model of
     NSFs Capabilities - Actions and default action";
} identity invoke-signaling {
  base egress-action-capability;
  description
    "Identity for invoke signaling action capability";
  reference
    "RFC 8329: Framework for Interface to Network Security
     Functions - Invoke-signaling action";
} identity tunnel-encapsulation {
  base egress-action-capability;
  description
    "Identity for tunnel encapsulation action capability";
  reference
    "RFC 8329: Framework for Interface to Network Security
     Functions - Tunnel-encapsulation action";
} identity forwarding {
  base egress-action-capability;
  description
    "Identity for forwarding action capability";
  reference
```

[FIG. 14q]

```
    "RFC 8329: Framework for Interface to Network Security
    Functions - Forwarding action";
} identity redirection {
  base egress-action-capability;
  description
    "Identity for redirection action capability";
  reference
    "RFC 8329: Framework for Interface to Network Security
    Functions - Redirection action";
} identity resolution-strategy-capability {
  description
    "Base identity for resolution strategy capability";
  reference
    "draft-ietf-i2nsf-capability-05: Information Model of
    NSFs Capabilities - Resolution Strategy";
} identity fmr {
  base resolution-strategy-capability;
  description
    "Identity for First Matching Rule (FMR) resolution
    strategy capability";
  reference
    "draft-ietf-i2nsf-capability-05: Information Model of
    NSFs Capabilities - Resolution Strategy";
} identity lmr {
  base resolution-strategy-capability;
  description
    "Identity for Last Matching Rule (LMR) resolution
    strategy capability";
  reference
    "draft-ietf-i2nsf-capability-05: Information Model of
    NSFs Capabilities - Resolution Strategy";
} identity pmr {
  base resolution-strategy-capability;
  description
    "Identity for Prioritized Matching Rule (PMR) resolution
    strategy capability";
  reference
    "draft-ietf-i2nsf-capability-05: Information Model of
```

[FIG. 14r]

```
    NSFs Capabilities - Resolution Strategy";
} identity pmre {
  base resolution-strategy-capability;
  description
    "Identity for Prioritized Matching Rule with Errors (PMRE)
    resolution strategy capability";
  reference
    "draft-ietf-i2nsf-capability-05: Information Model of NSFs
    Capabilities - Resolution Strategy";
} identity pmrn {
  base resolution-strategy-capability;
  description
    "Identity for Prioritized Matching Rule with No Errors (PMRN)
    resolution strategy capability";
  reference
    "draft-ietf-i2nsf-capability-05: Information Model of NSFs
    Capabilities - Resolution Strategy";
} identity advanced-nsf-capability {
  description
    "Base identity for advanced network security function (NSF)
    capabilities";
  reference
    "RFC 8329: Framework for Interface to Network Security
    Functions - Differences from ACL Data Models
    draft-dong-i2nsf-asf-config-01: Configuration of Advanced
    Security Functions with I2NSF Security Controller -
    Advanced NSF Capability";
} identity anti-virus-capability {
  base advanced-nsf-capability;
  description
    "Identity for advanced NSF anti-virus capabilities";
  reference
    "RFC 8329: Framework for Interface to Network Security
    Functions - Differences from ACL Data Models
    draft-dong-i2nsf-asf-config-01: Configuration of Advanced
    Security Functions with I2NSF Security Controller -
    Anti-Virus";
} identity anti-ddos-capability {
```

[FIG. 14s]

```
  base advanced-nsf-capability;
  description
    "Identity for advanced NSF anti-ddos capabilities";
  reference
    "RFC 8329: Framework for Interface to Network Security
     Functions - Differences from ACL Data Models
     draft-dong-i2nsf-asf-config-01: Configuration of Advanced
     Security Functions with I2NSF Security Controller -
     Anti-DDoS";
} identity ips-capability {
  base advanced-nsf-capability;
  description
    "Identity for advanced NSF Intrusion Prevention System
    (IPS) capabilities";
  reference
    "RFC 8329: Framework for Interface to Network Security
     Functions - Differences from ACL Data Models
     draft-dong-i2nsf-asf-config-01: Configuration of Advanced
     Security Functions with I2NSF Security Controller -
     Intrusion Prevention System";
} identity voip-volte-capability {
  base advanced-nsf-capability;
  description
    "Identity for advanced NSF VoIP/VoLTE capabilities";
  reference
    "RFC 3261: SIP: Session Initiation Protocol
     RFC 8329: Framework for Interface to Network Security
     Functions - Differences from ACL Data Models
     draft-dong-i2nsf-asf-config-01: Configuration of Advanced
     Security Functions with I2NSF Security Controller";
} identity detect {
  base anti-virus-capability;
  description
    "Identity for advanced NSF Anti-Virus detection capability";
  reference
    "draft-dong-i2nsf-asf-config-01: Configuration of Advanced
     Security Functions with I2NSF Security Controller -
     Anti-Virus";
} identity exception-application {
  base anti-virus-capability;
```

【FIG. 14t】

```
  description
    "Identity for advanced NSF Anti-Virus exception application
    capability";
  reference
    "draft-dong-i2nsf-asf-config-01: Configuration of Advanced
    Security Functions with I2NSF Security Controller -
    Anti-Virus";
} identity exception-signature {
  base anti-virus-capability;
  description
    "Identity for advanced NSF Anti-Virus exception signature
    capability";
  reference
    "draft-dong-i2nsf-asf-config-01: Configuration of Advanced
    Security Functions with I2NSF Security Controller -
    Anti-Virus";
} identity whitelists {
  base anti-virus-capability;
  description
    "Identity for advanced NSF Anti-Virus whitelists capability";
  reference
    "draft-dong-i2nsf-asf-config-01: Configuration of Advanced
    Security Functions with I2NSF Security Controller -
    Anti-virus";
} identity syn-flood-action {
  base anti-ddos-capability;
  description
    "Identity for advanced NSF Anti-DDoS syn flood action
    capability";
  reference
    "draft-dong-i2nsf-asf-config-01: Configuration of Advanced
    Security Functions with I2NSF Security Controller -
    Anti-DDoS";
} identity udp-flood-action {
  base anti-ddos-capability;
  description
    "Identity for advanced NSF anti-DDoS UDP flood action
    capability";
  reference
    "draft-dong-i2nsf-asf-config-01: Configuration of Advanced
```

[FIG. 14u]

```
      Security Functions with I2NSF Security Controller -
      Anti-DDoS";
} identity http-flood-action {
  base anti-ddos-capability;
  description
    "Identity for advanced NSF anti-DDoS http flood action
    capability";
  reference
    "draft-dong-i2nsf-asf-config-01: Configuration of Advanced
    Security Functions with I2NSF Security Controller -
    Anti-DDoS";
} identity https-flood-action {
  base anti-ddos-capability;
  description
    "Identity for advanced NSF Anti-DDoS https flood action
    capability";
  reference
    "draft-dong-i2nsf-asf-config-01: Configuration of Advanced
    Security Functions with I2NSF Security Controller -
    Anti-DDoS";
} identity dns-request-flood-action {
  base anti-ddos-capability;
  description
    "Identity for advanced NSF anti-DDoS dns request
    flood action capability";
  reference
    "draft-dong-i2nsf-asf-config-01: Configuration of Advanced
    Security Functions with I2NSF Security Controller -
    Anti-DDoS";
} identity dns-reply-flood-action {
  base anti-ddos-capability;
  description
    "Identity for advanced NSF Anti-DDoS DNS reply flood action
    capability";
  reference
    "draft-dong-i2nsf-asf-config-01: Configuration of Advanced
    Security Functions with I2NSF Security Controller -
    Anti-DDoS";
}
```

[FIG. 14v]

```
identity icmp-flood-action {
  base anti-ddos-capability;
  description
    "Identity for advanced NSF Anti-DDoS ICMP flood action
    capability";
  reference
    "draft-dong-i2nsf-asf-config-01: Configuration of Advanced
    Security Functions with I2NSF Security Controller -
    Anti-DDoS";
} identity icmpv6-flood-action {
  base anti-ddos-capability;
  description
    "Identity for advanced NSF Anti-DDoS ICMPv6 flood action
    capability";
  reference
    "draft-dong-i2nsf-asf-config-01: Configuration of Advanced
    Security Functions with I2NSF Security Controller -
    Anti-DDoS";
} identity sip-flood-action {
  base anti-ddos-capability;
  description
    "Identity for advanced NSF Anti-DDoS SIP flood action
    capability";
  reference
    "draft-dong-i2nsf-asf-config-01: Configuration of Advanced
    Security Functions with I2NSF Security Controller -
    Anti-DDoS";
} identity detect-mode {
  base anti-ddos-capability;
  description
    "Identity for advanced NSF Anti-DDoS detection mode
    capability";
  reference
    "draft-dong-i2nsf-asf-config-01: Configuration of Advanced
    Security Functions with I2NSF Security Controller -
    Anti-DDoS";
} identity baseline-learning {
  base anti-ddos-capability;
  description
    "Identity for advanced NSF Anti-DDoS baseline learning
```

[FIG. 14w]

```
      capability";
    reference
      "draft-dong-i2nsf-asf-config-01: Configuration of Advanced
      Security Functions with I2NSF Security Controller -
      Anti-DDoS";
  } identity signature-set {
    base ips-capability;
    description
      "Identity for advanced NSF IPS signature set capability";
    reference
      "draft-dong-i2nsf-asf-config-01: Configuration of Advanced
      Security Functions with I2NSF Security Controller -
      Intrusion Prevention System";
  } identity ips-exception-signature {
    base ips-capability;
    description
      "Identity for advanced NSF IPS exception signature
      capability";
    reference
      "draft-dong-i2nsf-asf-config-01: Configuration of Advanced
      Security Functions with I2NSF Security Controller -
      Intrusion Prevention System";
  } identity voice-id {
    base voip-volte-capability;
    description
      "Identity for advanced NSF VoIP/VoLTE voice-id capability";
    reference
      "RFC 3261: SIP: Session Initiation Protocol";
  } identity user-agent {
    base voip-volte-capability;
    description
      "Identity for advanced NSF VoIP/VoLTE user agent capability";
    reference
      "RFC 3261: SIP: Session Initiation Protocol";
  } identity ipsec-capability {
    description
      "Base identity for an IPsec capabilities";
  }
```

[FIG. 14x]

```
identity ike {
  base ipsec-capability;
  description
    "Identity for an IPSec Internet Key Exchange (IKE)
    capability";
} identity ikeless {
  base ipsec-capability;
  description
    "Identity for an IPSec without Internet Key Exchange (IKE)
    capability";
}

/*
 * Grouping
 */ grouping nsf-capabilities {
  description
    "Network Security Function (NSF) Capabilities";
  reference
    "RFC 8329: Framework for Interface to Network Security
     Functions - I2NSF Flow Security Policy Structure
     draft-ietf-i2nsf-capability-05: Information Model of
     NSFs Capabilities - Capability Information Model Design";

leaf-list time-capabilities {
    type enumeration {
      enum absolute-time {
        description
          "absolute time capabilities.
          If a network security function has the absolute time
          capability, the network security function supports
          rule execution according to absolute time.";
      }
      enum periodic-time {
        description
          "periodic time capabilities.
          If a network security function has the periodic time
          capability, the network security function supports
          rule execution according to periodic time.";
      }
    }
    description
      "Time capabilities";
  }
```

[FIG. 14y]

```
container event-capabilities {
  description
    "Capabilities of events.
     If a network security function has the event capabilities,
     the network security function supports rule execution
     according to system event and system alarm.";

reference
    "RFC 8329: Framework for Interface to Network Security
     Functions - I2NSF Flow Security Policy Structure
     draft-ietf-i2nsf-capability-05: Information Model of
     NSFs Capabilities - Design Principles and ECA Policy
     Model Overview
     draft-ietf-i2nsf-nsf-monitoring-data-model-03: I2NSF
     NSF Monitoring YANG Data Model - System Alarm and
     System Events";

leaf-list system-event-capability {
    type identityref {
      base system-event-capability;
    }
    description
      "System event capabilities";
  } leaf-list system-alarm-capability {
    type identityref {
      base system-alarm-capability;
    }
    description
      "System alarm Capabilities";
  }
} container condition-capabilities {
  description
    "Conditions capabilities.";

container generic-nsf-capabilities {
    description
      "Conditions capabilities.
       If a network security function has the condition
       capabilities, the network security function
       supports rule execution according to conditions of
       IPv4, IPv6, TCP, UDP, ICMP, ICMPv6, and payload.";
    reference
      "RFC 791: Internet Protocol - IPv4
       RFC 792: Internet Control Message Protocol - ICMP
```

【FIG. 14z】

```
   RFC 793: Transmission Control Protocol - TCP
   RFC 768: User Datagram Protocol - UDP
   RFC 8200: Internet Protocol, Version 6 (IPv6)
   Specification - IPv6
   RFC 4443: Internet Control Message Protocol (ICMPv6)
   for the Internet Protocol Version 6 (IPv6) Specification
   - ICMPv6
   RFC 8329: Framework for Interface to Network Security
   Functions - I2NSF Flow Security Policy Structure
   draft-ietf-i2nsf-capability-05: Information Model of
   NSFs Capabilities - Design Principles and ECA Policy
   Model Overview";

leaf-list ipv4-capability {
  type identityref {
    base ipv4-capability;
  }
  description
    "IPv4 packet capabilities";
  reference
    "RFC 791: Internet Protocol";
} leaf-list icmp-capability {
  type identityref {
    base icmp-capability;
  }
  description
    "ICMP packet capabilities";
  reference
    "RFC 792: Internet Control Message Protocol - ICMP";
} leaf-list ipv6-capability {
  type identityref {
    base ipv6-capability;
  }
  description
    "IPv6 packet capabilities";
  reference
    "RFC 8200: Internet Protocol, Version 6 (IPv6)
     Specification - IPv6";
} leaf-list icmpv6-capability {
  type identityref {
    base icmpv6-capability;
  }
```

[FIG. 15a]

```
    description
      "ICMPv6 packet capabilities";
    reference
      "RFC 4443: Internet Control Message Protocol (ICMPv6)
       for the Internet Protocol Version 6 (IPv6) Specification
       - ICMPv6";
  } leaf-list tcp-capability {
    type identityref {
      base tcp-capability;
    }
    description
      "TCP packet capabilities";
    reference
      "RFC 793: Transmission Control Protocol - TCP";
  } leaf-list udp-capability {
    type identityref {
      base udp-capability;
    }
    description
      "UDP packet capabilities";
    reference
      "RFC 768: User Datagram Protocol - UDP";
  }
} container advanced-nsf-capabilities {
  description
    "Advanced Network Security Function (NSF) capabilities,
     such as Anti-Virus, Anti-DDoS, IPS, and VoIP/VoLTE.";
  reference
    "RFC 8329: Framework for Interface to Network Security
     Functions - Differences from ACL Data Models
     draft-dong-i2nsf-asf-config-01: Configuration of
     Advanced Security Functions with I2NSF Security
     Controller";

leaf-list anti-virus-capability {
    type identityref {
      base anti-virus-capability;
    }
    description
      "Anti-virus capabilities";
    reference
      "draft-dong-i2nsf-asf-config-01: Configuration of
```

【FIG. 15b】

```
        Advanced Security Functions with I2NSF Security
        Controller";
} leaf-list anti-ddos-capability {
  type identityref {
    base anti-ddos-capability;
  }
  description
    "Anti-ddos capabilities";
  reference
    "draft-dong-i2nsf-asf-config-01: Configuration of
    Advanced Security Functions with I2NSF Security
    Controller";
} leaf-list ips-capability {
  type identityref {
    base ips-capability;
  }
  description
    "Intrusion Prevention System (IPS) capabilities";
  reference
    "draft-dong-i2nsf-asf-config-01: Configuration of
    Advanced Security Functions with I2NSF Security
    Controller";
} leaf-list url-capability {
  type identityref {
    base url-capability;
  }
  description
    "URL capabilities";
  reference
    "draft-dong-i2nsf-asf-config-01: Configuration of
    Advanced Security Functions with I2NSF Security
    Controller";
} leaf-list voip-volte-capability {
  type identityref {
    base voip-volte-capability;
  }
  description
    "VoIP and VoLTE capabilities";
  reference
    "draft-dong-i2nsf-asf-config-01: Configuration of
```

[FIG. 15c]

```
          Advanced Security Functions with I2NSF Security
          Controller";
      }
    } leaf-list context-capabilities {
      type identityref {
        base context-capability;
      }
      description
        "Security context capabilities";
    }
  } container action-capabilities {
    description
      "Action capabilities.
       If a network security function has the action
       capabilities, the network security function supports
       the attendant actions for policy rules.";

leaf-list ingress-action-capability {
      type identityref {
        base ingress-action-capability;
      }
      description
        "Ingress-action capabilities";
    } leaf-list egress-action-capability {
      type identityref {
        base egress-action-capability;
      }
      description
        "Egress-action capabilities";
    } leaf-list log-action-capability {
      type identityref {
        base log-action-capability;
      }
      description
        "Log-action capabilities";
    }
  } leaf-list resolution-strategy-capabilities {
    type identityref {
```

【FIG. 15d】

```
      base resolution-strategy-capability;
    }
    description
      "Resolution strategy capabilities.
       The resolution strategies can be used to specify how
       to resolve conflicts that occur between the actions
       of the same or different policy rules that are matched
       for the same packet and by particular NSF";
    reference
      "draft-ietf-i2nsf-capability-05: Information Model of
       NSFs Capabilities - Resolution strategy";
  } leaf-list default-action-capabilities {
    type identityref {
      base default-action-capability;
    }
    description
      "Default action capabilities.
       A default action is used to execute I2NSF policy rules
       when no rule matches a packet. The default action is
       defined as pass, drop, alert, or mirror.";
    reference
      "RFC 8329: Framework for Interface to Network Security
       Functions - Ingress and egress actions
       draft-ietf-i2nsf-capability-05: Information Model of
       NSFs Capabilities - Default action";
  } leaf-list ipsec-method {
    type identityref {
      base ipsec-capability;
    }
    description
      "IPsec method capabilities";
    reference
      "draft-ietf-i2nsf-sdn-ipsec-flow-protection-08:
       Software-Defined Networking (SDN)-based IPsec Flow
       Protection - IPsec methods such as IKE and IKE-less";
  }
}

/*
 * Data nodes
 */ list nsf {
  key "nsf-name";
  description
    "The list of Network Security Function (NSF) capabilities";
  leaf nsf-name {
    type string;
    mandatory true;
    description
      "The name of network security function";
  }
 }
}

<CODE ENDS>
```

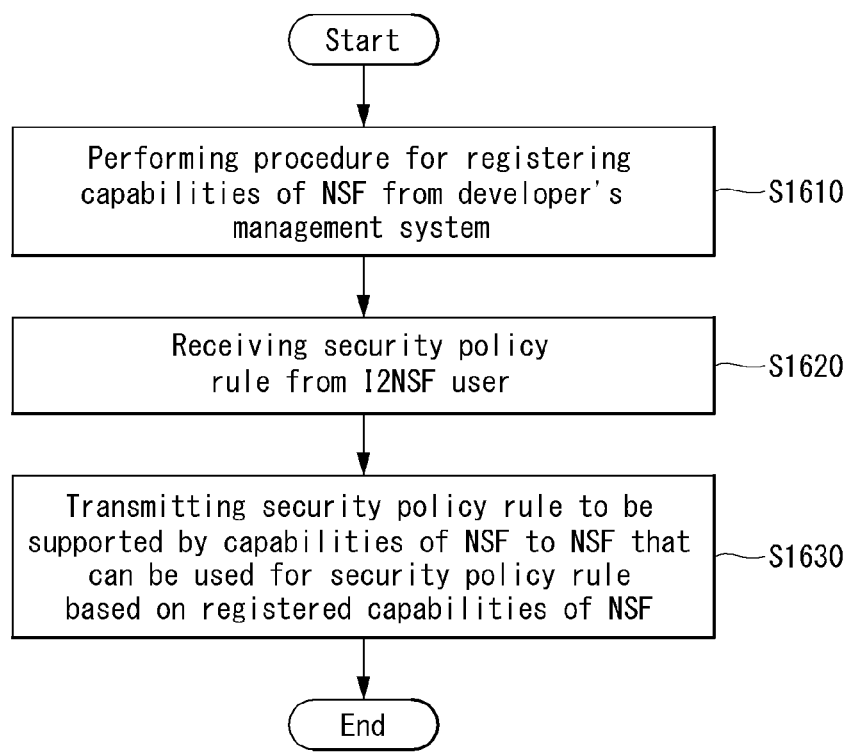
[FIG. 16]

[FIG. 17]

```
<nsf xmlns="urn:ietf:params:xml:ns:yang:ietf-i2nsf-capability">
 <nsf-name>general_firewall</nsf-name>
 <condition-capabilities>
  <generic-nsf-capabilities>
   <ipv4-capability>ipv4-protocol</ipv4-capability>
   <ipv4-capability>exact-ipv4-address</ipv4-capability>
   <ipv4-capability>range-ipv4-address</ipv4-capability>
   <tcp-capability>exact-fourth-layer-port-num</tcp-capability>
   <tcp-capability>range-fourth-layer-port-num</tcp-capability>
  </generic-nsf-capabilities>
 </condition-capabilities>
 <action-capabilities>
  <ingress-action-capability>pass</ingress-action-capability>
  <ingress-action-capability>drop</ingress-action-capability>
  <ingress-action-capability>alert</ingress-action-capability>
  <egress-action-capability>pass</egress-action-capability>
  <egress-action-capability>drop</egress-action-capability>
  <egress-action-capability>alert</egress-action-capability>
 </action-capabilities>
</nsf>
```

[FIG. 18]

```
<nsf xmlns="urn:ietf:params:xml:ns:yang:ietf-i2nsf-capability">
 <nsf-name>time_based_firewall</nsf-name>
 <time-capabilities>absolute-time</time-capabilities>
 <time-capabilities>periodic-time</time-capabilities>
 <condition-capabilities>
  <generic-nsf-capabilities>
   <ipv4-capability>ipv4-protocol</ipv4-capability>
   <ipv4-capability>exact-ipv4-address</ipv4-capability>
   <ipv4-capability>range-ipv4-address</ipv4-capability>
  </generic-nsf-capabilities>
 </condition-capabilities>
 <action-capabilities>
  <ingress-action-capability>pass</ingress-action-capability>
  <ingress-action-capability>drop</ingress-action-capability>
  <ingress-action-capability>alert</ingress-action-capability>
  <egress-action-capability>pass</egress-action-capability>
  <egress-action-capability>drop</egress-action-capability>
  <egress-action-capability>alert</egress-action-capability>
 </action-capabilities>
</nsf>
```

[FIG. 19]

```
<nsf xmlns="urn:ietf:params:xml:ns:yang:ietf-i2nsf-capability">
 <nsf-name>web_filter</nsf-name>
 <condition-capabilities>
  <advanced-nsf-capabilities>
   <url-capability>user-defined</url-capability>
  </advanced-nsf-capabilities>
 </condition-capabilities>
 <action-capabilities>
  <ingress-action-capability>pass</ingress-action-capability>
  <ingress-action-capability>drop</ingress-action-capability>
  <ingress-action-capability>alert</ingress-action-capability>
  <egress-action-capability>pass</egress-action-capability>
  <egress-action-capability>drop</egress-action-capability>
  <egress-action-capability>alert</egress-action-capability>
 </action-capabilities>
</nsf>
```

[FIG. 20]

```xml
<nsf xmlns="urn:ietf:params:xml:ns:yang:ietf-i2nsf-capability">
 <nsf-name>voip_volte_filter</nsf-name>
 <condition-capabilities>
  <advanced-nsf-capabilities>
   <voip-volte-capability>voice-id</voip-volte-capability>
  </advanced-nsf-capabilities>
 </condition-capabilities>
 <action-capabilities>
  <ingress-action-capability>pass</ingress-action-capability>
  <ingress-action-capability>drop</ingress-action-capability>
  <ingress-action-capability>alert</ingress-action-capability>
  <egress-action-capability>pass</egress-action-capability>
  <egress-action-capability>drop</egress-action-capability>
  <egress-action-capability>alert</egress-action-capability>
 </action-capabilities>
</nsf>
```

[FIG. 21]

```xml
<nsf xmlns="urn:ietf:params:xml:ns:yang:ietf-i2nsf-capability">
 <nsf-name>http_and_https_flood_mitigation</nsf-name>
 <condition-capabilities>
  <advanced-nsf-capabilities>
   <anti-ddos-capability>http-flood-action</anti-ddos-capability>
   <anti-ddos-capability>https-flood-action</anti-ddos-capability>
  </advanced-nsf-capabilities>
 </condition-capabilities>
 <action-capabilities>
  <ingress-action-capability>pass</ingress-action-capability>
  <ingress-action-capability>drop</ingress-action-capability>
  <ingress-action-capability>alert</ingress-action-capability>
  <egress-action-capability>pass</egress-action-capability>
  <egress-action-capability>drop</egress-action-capability>
  <egress-action-capability>alert</egress-action-capability>
 </action-capabilities>
</nsf>
```

I2NSF CAPABILITY YANG DATA MODEL

CROSS-REFERENCE TO RELATED APPLICATION

This application is based on and claims priority under 35 U.S.C. 119 to Korean Patent Application No. 10-2019-0090539, filed on Jul. 25, 2019, and No. 10-2020-0086467, filed on Jul. 13, 2020 the contents of which are all hereby incorporated by reference herein in their entirety.

BACKGROUND

Field

The present disclosure relates to a data model, and more specifically, is for defining a YANG data model for various capabilities of network security functions (NSF) of an interface to network security functions (I2NSF) framework to centrally manage the various capabilities of the NSF.

Description of Related Art

When a network is connected to the whole world, it is possible to quickly access information regardless of geometrical distance. The internet is fundamentally composed of a large number of networks in which hierarchies of different levels are connected to each other.

The internet is operated in accordance with TCP/IP (transmission control protocol/internet protocol) published by IETF (Internet Engineering Task Force), and the TCP/IP can be found from RFC (Request For Comments) 703 and RFC 791 issued by IETF.

SUMMARY

An object of the present disclosure is to provide a method and apparatus for centrally managing various capabilities of NSF in a security management system.

In addition, an object of the present disclosure is to provide a data model of an interface to network security functions (I2NSF) framework for centrally managing various capabilities of the NSF.

Technical objects to be achieved by the present disclosure are not limited to the aforementioned technical objects, and other technical objects not described above may be evidently understood by a person having ordinary skill in the art to which the present disclosure pertains from the following description.

An aspect of the present disclosure, in a method for managing capabilities of network security functions (NSF) by a security controller in a security management system, may include performing a procedure for registering the capabilities of the NSF from a developer's management system; receiving a security policy rule from an interface to network security function (I2NSF) user; and transmitting the security policy rule to be supported by the capabilities of the NSF to an NSF that can be used for the security policy rule based on the registered capabilities of the NSF.

In addition, the capabilities of the NSF may include a time capability, an event capability, a condition capability, an action capability, a resolution strategy capability and a default action capability.

In addition, the time capability may indicate when to evaluate the security policy rule related to the NSF, and may include an absolute time value or a periodic time value.

In addition, the event capability may be for triggering an evaluation of a condition of the security policy rule related to the NSF.

In addition, the condition capability may be for determining whether to perform an action of the security policy rule related to the NSF.

In addition, the action capability may be for indicating an action method of the NSF when events and conditions of the security policy rule related to the NSF are satisfied.

In addition, when a conflict of actions of the security policy rule related to the NSF occurs, the resolution strategy capability may be for resolving the conflict.

In addition, the method may further include determining an order of the actions of the security policy rule related to the NSF based on the resolution strategy capability when the conflict of actions of the security policy rule related to the NSF occurs.

In addition, the method may further include performing an action based on the default action capability if there is no determined order of the actions.

In addition, the default action capability may indicate an action that can be performed when the NSF that can be used for the security policy rule is not searched.

Another aspect of the present disclosure, in a security management system for managing capabilities of network security functions (NSF), may include a developer's management system configured to register the capabilities of the NSF to a security controller; an interface to network security function (I2NSF) user configured to provide a security policy rule for applying to the security management system to the security controller; and a security controller configured to perform a procedure for registering the capabilities of the NSF from the developer's management system, receive the security policy rule from the I2NSF user, and transmitting the security policy rule to be supported by the capabilities of the NSF to an NSF that can be used for the security policy rule based on the registered capabilities of the NSF.

According to an embodiment of the present disclosure, in the security management system, it is possible to centrally manage the various capabilities of the NSF.

In addition, it is possible to implement an interface to network security functions (I2NSF) framework for centrally managing the various capabilities of the NSF.

The effects obtained in the present disclosure are not limited to the above-mentioned effects, and other effects not mentioned will be clearly understood by those skilled in the art to which the present disclosure pertains from the following description.

BRIEF DESCRIPTION OF DRAWINGS

FIG. 1 shows an I2NSF (Interface to Network Security Functions) system according to an embodiment of the present disclosure.

FIG. 2 exemplifies an architecture of the I2NSF system according to an embodiment of the present disclosure.

FIG. 3 shows an example of an entire I2NSF information model design to which the present disclosure can be applied.

FIG. 4 shows an example of a network security information low-level model overview to which the present disclosure can be applied.

FIG. 5 shows an example of extension of a network security information low-level model to which the present disclosure can be applied.

FIG. 6 shows an example of extension a network security information low-level model event class to which the present disclosure can be applied.

FIG. 7 shows an example of extension a network security information sub-model condition class to which the present disclosure can be applied.

FIG. 8 shows an example of extension of a network security information sub-model action to which the present disclosure can be applied.

FIG. 9 shows an example of a high-level model of an I2NSF security function to which the present disclosure can be applied.

FIG. 10 shows an example of extension of a network security function information model to which the present disclosure can be applied.

FIG. 11 shows an example of extension of an attack mitigation function information model to which the present disclosure can be applied.

FIG. 12 illustrates capabilities of NSF in an I2NSF Framework according to an embodiment of the present disclosure.

FIG. 13 illustrates a YANG data model structure for capabilities of the NSF according to an embodiment of the present disclosure.

FIGS. 14*a*, 14*b*, 14*c*, 14*d*, 14*e*, 14*f*, 14*g*, 14*h*, 14*i*, 14*j*, 14*k*, 14*l*, 14*m*, 14*n*, 14*o*, 14*p*, 14*q*, 14*r*, 14*s*, 14*t*, 14*u*, 14*v*, 14*w*, 14*x*, 14*y*, and 14*z*, and 15*a*, 15*b*, 15*c*, and 15*d* illustrate a YANG data model of a network security function capability that can be applied in the present disclosure.

FIG. 16 is an embodiment to which the present disclosure can be applied.

FIG. 17 shows the configuration XML for capabilities registration of general firewall.

FIG. 18 shows the configuration XML for capabilities registration of time based firewall.

FIG. 19 shows the configuration XML for capabilities registration of web filter.

FIG. 20 shows the configuration XML for capabilities registration of VoIP/VoLTE filter.

FIG. 21 shows the configuration XML for capabilities registration of http and https flood mitigation.

Accompanying drawings included as a part of the detailed description for helping understand the present disclosure provide embodiments of the present disclosure and are provided to describe technical features of the present disclosure with the detailed description.

DETAILED DESCRIPTION

Hereinafter, preferred embodiments of the present disclosure will be described in detail with reference to the accompanying drawings. The detailed description that will be provided with the accompanying drawings is provided to explain exemplary embodiments of the present disclosure and is not intended to unique embodiments that can implement the present disclosure. The following detailed description includes details to help complete understand the present disclosure. However, those skilled in the art know that the present disclosure can be implemented even without the details.

In some cases, well-known structures and devices may be omitted or the important capability of each structure and device may be shown in a block diagram type to avoid making the concept of the present disclosure unclear.

Specific terms that are used in the following description are provided to help understand the present disclosure, and use of these specific terms may be changed in other ways without departing from the technical spirit of the present disclosure.

Recently, a fundamental standard interface for an NFV-based security function is developed by an NFV-based security function working group. This is a portion of the international internal standard organization called an IETF (Internet Engineering Task Force).

The object of the I2NSF is for defining a standardized interface for a heterogeneous NSF(s) (network security function) provided by several security solution vendors.

In an I2NSF architecture, without considering management of an NSF(s) in detail (management of NSF requires enforcement of a security policy), a user can define a protection policy for protecting network resources in a network system. Further, an interface standardized to an NSF(s) from several vendors can simplify setting and managing of tasks for a heterogeneous NSF(s).

FIG. 1 shows an I2NSF (Interface to Network Security Functions) system according to an embodiment of the present disclosure.

Referring to FIG. 1, an I2NSF system includes an I2NSF user, a network operator management system, a developer's management system, and/or at least one NSF (Network Security Function).

The I2NSF user communicates with the network operator management system through an I2NSF consumer-facing interface. The network operator management system communicates with an NSF(s) through an I2NSF NSF-facing interface. The developer's management system communicates with the network operator management system through an I2NSF registration interface. Hereafter, each component of an I2NSF system (I2NSF component) and each interface (I2NSF interface) are described.

I2NSF User

An I2NSF user is an I2NSF component that requests information from another I2NSF component (e.g., a network operator management system) and/or uses a service (e.g., a network security service) provided by another I2NSF component (e.g., a developer's management system). For example, the I2NSF user may be an overlay network management system, an enterprise network manager system, another network domain manager, etc.

The object that performs the functions designated to the I2NSF user component may be referred to as an I2NSF consumer. As an example of the I2NSF consumer, a video-conference network manager that needs to dynamically give a notice to an underlay network to allow, rate-limit, or reject flow on the basis of a specific field of a packet for a time span, enterprise network administrators and management systems that needs to request a vendor network to enforce a specific I2NSF policy for specific flow, and an IoT management system that transmits a request to an underlay network to block flow coinciding with a set of a specific condition may be included.

The I2NSF user can create and distribute a high-level security policy. In detail, the I2NSF user needs to use a network security service to protect a network traffic from various malicious attacks. In order to request this security service, the I2NSF user can create a high-level security policy for a security service that it desires, and can inform the network operator management system of the high-level security polity.

Meanwhile, in the process of preparing the high-level security polity, the I2NSF user has to consider the type of an NSF(s) required to implement a security service or a security policy rule configuration for each NSF(s).

Further, the I2NSF user can be notified of a security event(s) in underlying an NSF(s) by the network operator management system. By analyzing the security event(s), the I2NSF user can recognize new attacks and can update (or create) a high-level security policy for dealing with the new attacks. As described above, the I2NSF user can define, manage, and monitor a security policy.

Network Operator Management System

The network operator management system is a component that performs collection, distribution, and point for providing security, monitoring, and other actions. For example, the network operator management system may be a security controller. The network operator management system may be managed by a network security manager and may be referred to as an I2NSF management system.

One of the important functions of the network operator management system (or security controller) is to translate a high-level security policy (or policy rule) from the I2NSF user into a low-level security policy rule for a specific NSF(s). The network operator management system (or security controller) may receive a high-level security policy from the I2NSF user and determine the type of an NSF(s) required to enforce a policy requested first by the I2NSF user. Further, the network operator management system (security controller) may create a low-level security policy for each requested NSF(s) As a result, the network operator management system (or security controller) may set the created low-level security policy to each NSF(s).

Further, the network operator management system (or security controller) may monitor an NSF(s) that is being in driven in a system, and may maintain various items of information (e.g., network access information and a workload state) about each NSF(s). Further, the network operator management system (or security controller) may dynamically manage the pool of an NSF instance through dynamic life-cycle management of the NSF instance with the assistance of the developer's management system.

NSF

The NSF is a logical entity or a software component that provides a security-related service. For example, the NSF may receive a low-level security policy, and may sense and block or attenuate a malicious network traffic on the basis of the low-level security policy. Accordingly, integrity and confidentiality of a network communication stream can be secured.

Developer's Management System

The developer's management system is an I2NSF component that sends information to another I2NSF component (e.g., the I2NSF user or the network operator management system) and/or provide a service (e.g., a network security service). The developer's management system may be referred to as a vendor's management system. An object that performs a function designated to the developer's management system may be referred to as an I2NSF producer.

The developer's management system may be managed by a third-party security vendor that provides an NSF(s) to the network operator management system. Several developer's management systems of various security vendors may exist.

I2NSF Consumer-Facing Interface (Briefly, Consumer-Facing Interface (CFI)

The CFI is an interface to an I2NSF system of a user, positioned between the I2NSF user and the network operator management system. By being designed in this way, only an abstract view of an NSF(s) is provided to a user with the details of an underlying NSF(s) hidden.

The CFI may be used to enable different users of an I2NSF system to define, manage, and monitor a security policy for specific flow in a management domain. A high-level security policy (policy rule) created by the I2NSF user may be transmitted to the network operator management system through the CFI I2NSF NSF-Facing Interface (Briefly, NSF-Facing Interface (NFI)

The NFI is an interface positioned between the network operator management system (or security controller) and an NSF(s).

The NFI may be used to designate and monitor a flow-based security policy enforced by one or more NSFs. For example, the I2NSF system may use a flow-based NSF. In this case, the flow-based NSF is an NSF that examines network from in accordance with a set of policies to reinforce the security characteristic. Flow-based security by the flow-based NSF means that packets are examined in the received order and there is no correction for the packets in accordance with an examination process. The interface for the flow-based NSF may be classified as follows:

NSF Operational and Administrative Interface: An interface group used by the I2NSF management system to program the operation state of an NSF; this interface group also includes a management control capability. The I2NSF policy rule is one method of changing the interface group in a consistent manner Since an application and an I2NSF component need to dynamically control the actions of traffics that they transmit and receive, most of I2NSF efforts are concentrated on the interface group.

Monitoring Interface: An interface group used by the I2NSF management system to obtain monitoring information of one or more selected NSFs; each interface of this interface group may be a query- or report-based interface. The difference between the two is that the query-based interface is used by the I2NSF management system to obtain information, but the report-based interface is used by an NSF to provide information. The capability of the interface group may also be defined by another protocol such as LOG[RFC 5424] and DOTS (Distributed Denial-of-Service Open Threat Signaling) [RFC 8782]. The I2NSF management system may take one or more actions on the basis of reception of information. This should be designated by a policy rule. The interface group does not change the operation state of an NSF.

As described above, the NFI may be developed using a flow-based paradigm. The common trait of the flow-based NSF is to process a packet on the basis of the contents (e.g., header/payload) and/or context (e.g., a session state and an authentication state) of a received packet. This trait is one of requirements for defining the action of the I2NSF system.

Meanwhile, the I2NSF system does not need to use all abilities of a given NSF and does not need to use all available NSFs. Accordingly, this abstraction enables an NSF feature to be handled in a building block by an NSF system. Therefore, a developer may freely use a security capability defined by an individual NSF for a vendor and a technology.

I2NSF Registration Interface (Briefly, Registration Interface (RI))

The RI is an interface positioned between the network operator management system and the developer's management system. NSFs provided by different vendors may have different capabilities. Accordingly, in order to automate a process that uses various types of security capabilities provided by different vendors, the vendors need to have an exclusive interface for determining the capabilities of their NSFs. These exclusive interfaces may be referred to as I2NSF registration interface (RI).

The capability of an NSF may be configured in advance or may be dynamically searched through an I2NSF registration interface. If a new capability that is exposed to a consumer is added to an NSF, in order that interested management and control entity can know that, a new capability needs to be registered on an I2NSF registry through the I2NSF registration interface.

FIG. 2 exemplifies an architecture of the I2NSF system according to an embodiment of the present disclosure. The I2NSF system of FIG. 2 shows in more detail the configuration of an I2NSF user and a network operator management system in comparison to the I2NSF system of FIG. 1. In FIG. 2, description overlapping the detailed description of FIG. 1 is omitted.

Referring to FIG. 2, an I2NSF system includes an I2NSF user, a security management system, and an NSF instance hierarchy. An I2NSF user hierarchy includes an application logic, a policy updater, and an event collector as components. A security management system hierarchy includes a security controller and a developer's management system. The security controller of the security management system hierarchy includes a security policy manager and an NSF capability manager as components.

The I2NSF user hierarchy communicates with the security management system hierarchy through a consumer-facing interface. For example, the policy updater and the event collector of the I2NSF user hierarchy communicates with the security controller of the security management system hierarchy through a consumer-facing interface. Further, the security management system hierarchy communicates with an NSF instance hierarchy through an NSF-facing interface. For example, the security controller of the security management system hierarchy communicates with an NSF instance(s) of the NSF instance hierarchy through the NSF-facing interface. Further, the developer's management system of the security management system hierarchy communicates with the security controller of the security management system hierarchy through a registration interface.

The I2NSF user hierarchy, the security controller component of the security management system hierarchy, the developer's management system component of the security management system hierarchy, and the NSF instance hierarchy of FIG. 2 respectively correspond to the I2NSF user hierarchy, the network operator management system component, the developer's management system component, and the NSF component of FIG. 1. Further, the consumer-facing interface, the NSF-facing interface, and the registration interface of FIG. 2 correspond to the consumer-facing interface, the NSF-facing interface, and the registration interface of FIG. 1. Hereafter, newly defined components included in each hierarchy are described.

I2NSF User

As described above, an I2NSF user hierarchy includes the following three components: an application logic, a policy updater, and an event collector. The function and action of each component are as follows.

The application logic is a component that creates a high-level security policy. To this end, the application logic receives an event for updating (or creating a high-level policy from the event collector and updates (or creates) the high-level policy on the basis of the collected event. Thereafter, the high-level policy is sent to the policy updater to be distributed to the security controller. In order to update (or create) the high-level policy, the event collector receives events sent by the security collector and sends them to the application logic. On the basis of this feedback, the application logic may update (or create) the high-level security policy.

In FIG. 2, the application logic, the policy updater, and the event collector are shown as individual configurations, but the present disclosure is not limited thereto. In other words, each of them is a logic component and may be implemented as one or two components in the I2NSF system.

Security Management System

As described above, the security controller of the security management system hierarchy includes two components such as a security policy manager and an NSF capability manager.

The security policy manager may receives a high-level policy from the policy updater through the CFI and may map the policy to a low-level policy. The low-level policy is related to a given NSF capability registered in an NSF capability manager. Further, the security policy manager may transmit the policy to an NSF(s) through the NFI.

The NSF capability manager may designate the capability of an NSF registered by the developer's management system and share the capability with the security policy manager to create a low-level policy related to a given NSF capability. Every time a new NSF is registered, the NSF capability manager may request the developer's management system to register the capability of the NSF in a management table of the NSF capability manager through the registration interface. The developer's management system correspond to another part of the security management system fro registering the capability of a new NSF to the NSF capability manager.

In FIG. 2, the security policy manager and the NSF capability manager are shown as individual configurations, but the present disclosure is not limited thereto. In other words, each of them is a logic component and may be implemented as one component in the I2NSF system.

NSF Instances

As shown in FIG. 2, the NSF instance hierarchy includes NSFs. In this case, all the NSFs are positioned in the NSF instance hierarchy. Meanwhile, a high-level policy is mapped to a low-level policy and then the security policy manager transmits the policy to the NSF(s) through the NFI. In this case, the NSF may sense and block or attenuate a malicious network traffic on the basis of the received low-level security policy.

For quick development of a virtualization system, a high-class security capability is required in various scenarios (e.g., the network device of an enterprise network, the user equipment of a mobile network, a device of the internet, or a resident access user).

NSFs produced by several security companies may provide various security capabilities to customers. That is, regardless of whether NSF are implemented by a physical or virtual capability, several NSF may provide a security service for a given network traffic by being combined with each other.

A security capability means a capability related to security of a series of networks that can be used for enforcing a security policy. The security capability is independent from an actually implemented security control mechanism and a set of capabilities that can be provided by NSFs is registered in all NSFs.

The security capability is a market leader providing a method that can define customized security protection by clearly explaining the security capability provided by a specific NSF. Further, the company supplying the security capability may be explained in a neutral manner through the security capability.

That is, it is not required to state a specific product and a feature may be considered for each capability when designing a network.

As described above, as the I2NSF interface that can be used for providing a security policy, two types may exist as follows.

An interface and a security controller between an I2NSF user and an application program (Consumer-Facing Interface): Service-directional interface providing NSF data and a communication channel between a service user and a network operator management system (or security controller).

The I2NSF Consumer-Facing Interface enables security information to be used for exchange between various applications (e.g., OpenStack or various BSS/OSS components) and a security controller. The design target of the Consumer-Facing Interface is to implement and separate specs of a security service.

An interface (e.g., a firewall, anti-invasion or anti-virus) and a security controller between NSFs (NSF-Facing interface): The NSF-Facing Interface is used to separate a security management system from an NSF set and several implements and is independent in the manner in which an NSF is implemented (e.g., a virtual machine or actual appliances).

Hereafter, an object-directional information model about network security, contents security, and an attach attenuation capability is described with related I2NSF policy objects.

In the present disclosure, terms used in an information module may be defined as follows.

AAA: Access control, Authorization, Authentication
ACL: Access Control List
(D) DoD: (Distributed) Denial of Service (attack)
ECA: Event-Condition-Action
FMR: First Matching Rule (resolution strategy)
FW: Firewall
GNSF: Generic Network Security Function
HTTP: HyperText Transfer Protocol
I2NSF: Interface to Network Security Functions
IPS: Intrusion Prevention System
LMR: Last Matching Rule (resolution strategy)
MIME: Multipurpose Internet Mail Extensions
NAT: Network Address Translation
NSF: Network Security Function
RPC: Remote Procedure Call
SMA: String Matching Algorithm
URL: Uniform Resource Locator
VPN: Virtual Private Network
Information Model Design The start point of designing of a capability information model is to classify the types of security capabilities. For example, it is to classify the types of security types such as "IPS", "antivirus", and "VPN concentration apparatus".

Alternatively, a "packet filter" may be classified into a storage device that can allow for or reject packet transmission in accordance with various conditions (e.g., transmission and reception IP addresses, transmission and reception ports, and an IP protocol type field).

However, other devices such as a state-based firewall or an application program layer filter require more information. These devices filter a packet or communication, but are different in the state that categorizes and maintains packets and communications.

Analog consideration points may be considered in channel protection protocols. The channel protection protocols may protect a packet through a symmetric algorithm that can be negotiated into an asymmetric password, may operate in different layers, and may support different algorithms and protocols.

For safe protection, perfection, selective secrecy, anti-reply protection, and peer authentication should be applied to these protocols.

Capability Information Model Overview

A capability information model defines a security capability model providing a base for automatic management of an NSF. The capability information module includes allowing a security controller to appropriately recognize and manage an NSF and appropriately declare such that an NSF can use capabilities in a correct way.

Some basic rules for security and a system that has to manage the basic rules are as follows.

Independence: Each security capability should be capability that has minimum overlap or dependence to another capability. Accordingly, the security capabilities can be freely used and combined. It is more important that a change to one capability does not influence another capability.

This follows Single Responsibility Principle [Martin] [OODSRP].

Abstraction: Each capability should be defined in an vendor-independent manner and should provide a standardized capability that is connected with a well-known interface and can describe and report a processing result. Accordingly, mutual operability with multiple vendors can be improved.

Automation: A system should be able to automatically search, automatically negotiate, and automatically update a security capability (i.e., without intervention of a user). This automation capability is particularly useful for managing several NSFs.

It is necessary to add a smart service (e.g., analysis, refinement, capability inference, and optimization) to a selected security system. This capability is supported in main design patterns such as Observer Pattern [OODOP], Mediator Pattern [OODMP], and Message Exchange Patterns [Hohpe].

Extendibility: A management system should have a scale up/down or scale in/out capability. Accordingly, due to this extendibility, it is possible to satisfy various performance requirements derived from a variable network traffic or service request. Further, a security capability that is influenced by extendibility may help to determine whether to call out a scaling only when supporting a report statistics to a security controller.

Abstraction having a standard interface and a vender neutral capability set may be defined in accordance with the basic rules. This provides definition such that a capability model enabling a necessary NSF set to be used within a give time and security provided by a used NSF set is not ambiguous.

The security controller selects an NSF required to satisfy corresponding requirements by comparing requirements of a user and an application program with a currently available capability set.

Further, when an unknown threat (e.g., zero-day exploits and unknown malware) is reported by an NSF, a new capability may be created and/or the existing capability may be updated (e.g., by updating its signature and algorithm). As a result, the existing NSF is reinforced (and/or a new NSF is created) to cope with a new threat.

The new capability may be transmitted and stored in a central repository or may be individually stored in a local repository of a vendor. In both cases, a standard interface enables an update process to be easily performed.

ECA Policy Model Overview

An "Event-Condition-Action" (ECA) policy model is used as a base for design of an I2NSF policy rule. IN this case, terms related to the I2NSF policy may be defined as follows (see ([I-D.draft-ietf-i2nsf-terminology]).

Event: An event occurs at an important point when a system that is managed is changed or in time in the environment of a system that is managed. An event may be used to determine whether it is possible to evaluate a condition clause of the I2NSF when being used in a context of the I2NSF policy rule. As an example of an I2NSF event, there may be a time and a user action (e.g., logon, logoff, and an action violating ACL).

Condition: A condition is defined as a set of a property, a capability, and/or a value to be compared with a set of a known property, feature, and/or value, and may execute or may not execute the (imperative) I2NSF policy rule. In an example of the I2NSF, coinciding property of a packet or flow and comparison of the internal state of an NSF with a desired state may be included.

Action: An action is used to control and monitor the side of a flow-based NSF when an event and a condition clause are satisfied. An NSF provides a security capability by executing various actions. In an example of an I2NSF work, intrusion detection and/or protection, web and flow filtering, and providing deep packet examination for a packet and flow may be included.

The I2NSF policy rule is composed of three Boolean clauses of an event clause, a condition clause, and an action clause.

The Boolean clause means a logical statement that is evaluated as TRUE or FALSE and may be composed of one or more terminologies.

When there are two or more terminologies, the Boolean clause connects the terminologies using logical connectives (i.e., ANA, OR, and NOT). The logical connectives may have the meanings in the following Table 1.

[Table 1]

Technically, a "policy rule" may actually function as a container aggregating not only metadata, but also the "event", "action" and "condition" described above.

The ECA policy model described above is very general, may be easily extended, and may avoid a latent limitation that may limit a generic security capability implementation.

Relationship with External Information Model

FIG. 3 shows an example of an entire I2NSF information model design to which the present disclosure can be applied.

An I2NSF NSF-Facing Interface selects and manages an NSF using the capability of the NSF, which is performed using the following approach.

1) Each NSF registers the capability in a management system when it "participates", so it may use the capability in a management system.

2) A security controller selects a capability set required to satisfy requirements of a security service in all available NSFs that are managed.

3) The security controller coincides a capability selected using a capability information model with an NSF independent from a vendor.

4) The security controller manages an NSF by taking the information and creating or using one or more data models of a capability information model.

5) Controlling and monitoring may be started.

This approach may be assumed as being used by an external information model defining concepts such as an ECA policy rule and the components (e.g., an event, a condition, and a measure object). Accordingly, it is possible to classify the I2NSF policy rule into a low class from the external information model.

In the present disclosure, the data model shows a concept of an interest in an environment in a way of depending on a storage of data, a data definition language, a query language, an implementation language, and a protocol.

Further, the information model shows an interest concept about an environment in a way that is independent from a data storage, a data definition language, a query language, an implementation language, and a protocol.

A capability may be defined as a class (e.g., a set of objects showing a common characteristic and a behavior set) (see I-D.draft-ietf-supa-generic-policy-info-model).

Each capability may be composed of one or more model elements (e.g., a property, a method, and a relationship) that are discriminated from all other objects. The capability is generally a kind of metadata (i.e., information explaining and/or prescribing the behavior of an object).

Accordingly, each capability may be used for the external information model to define metadata. Accordingly, capabilities may be classified into a low class from an external metadata model.

The capability sub-model is used to advertise, create, select, and manage a specific security capability set that is independent from the type of a device including the NSF and a vendor.

That is, a user of the NSF-Facing Interface does not consider whether an NSF is virtualized or hosted, what is the NSF vendor, and an entity set that an NSF communicates with (e.g., a firewall or an IPS).

Instead, the user considers only a capability set such as packet filtering or deep packet examination that an NSF has.

Design of the entire ISNSF information module is shown in FIG. 3.

All the external models shown in FIG. 3 may be based on a SUPA information model (see I-D.draft-ietf-supa-generic-policy-info-model). The class of capability sub-model inherits a set of metadata aggregation AggregatesMetadata from an external metadata information model.

The external ECA information model shown in FIG. 3 provides a minimum glass set showing a generic ECA policy rule and a class set showing an event, a condition, and an action that may be aggregated by the generic ECA policy rule.

Accordingly, an I2NSF may not only reuse this generic model for another purpose, but also create a new low class or add a property and a relationship to express an I2NSF-related concept.

In the present disclosure, it is assumed that the external ECA information model has a capability of collecting metadata. Capabilities may be classified into a low class from an appropriate class in the external metadata information model.

This enables an ECA object to add metadata to an appropriate ECA object using the metadata and existing aggregation.

Hereafter, each part of the information model is described.

I2NSF Capability Information Model: Theory of Operation

A capability is used to show an NSF function that may be generally called. Since a capability is an object, it may be used in clauses explaining an event, a condition, and/or an action in an I2NSF ECA policy rule.

The I2NSF capability information model concretes a pre-defined metadata model. Application of the I2NSF capability may be performed by correcting a pre-defined ECA policy rule information model that defines a method of using, managing, or operating a capability set. In this approach, the I2NSF policy rule may function as a container composed of three clauses of an event clause, a condition clause, and a work clause.

When an I2NSF policy engine receives a series of events, the events are matched to events of an active ECA policy rule. When the events are matched, evaluation of a condition clause of matching I2NSF policy rule. When the condition clause is evaluated and is matched, a series of actions in the matching I2NSF policy rules may be performed.

Initial NSFs Capability Categories

Hereafter, three general functions of network security, contents security, and attack mitigation are described. The number and the function type of categories in a specific category described in the present disclosure may be both extended.

Network Security Capabilities

Network security is a category for explaining a method of examining and processing a network traffic using a pre-defined security policy.

An examination part may be a packet processing engine that examines a packet passing through a network directly or in view of flow related with the packet. In view of packing processing, a packet header that can be implemented and/or the depth of a payload, various flows and context state that can be maintained, an action that can be applied to a packet or flow may be changed in accordance with implementation.

Content Security Capabilities

Contents security is another category of a security function that is applied to an application program layer. For example, it is possible to recognize various necessary security functions by using a contents security function by analyzing traffic contents transmitted from an application program layer.

Defense against intrusion, virus search, malicious URL or junk mail filtering, illegal web access block, or malicious data search prevention may be included therein.

In general, there is an inherent characteristic set in each threat type of contents security and an inherent method set should used and processed for a corresponding type of contents. Accordingly, this function is characterized by a security function for each inherent content.

Attack Mitigation Capabilities

An attach mitigation capability is used to detect and mitigate various types of network attacks. At present, general network attacks may be defined as follows.

DDoS Attack'

Network Layer DDoS s Attack: SYN flood, UDP flood, ICMP flood, IP fragment flood, IPv6 routing header attack, and IPv6 duplicate address detection attacks may be exemplified.

Application Program layer DDoS attack: For example, there are HTTP flood, https flood, cache detour HTTP floods, WordPress XML RPC floods, and ssl DDoS.

Single Packet Attack:

Scanning and Spinning Attack" IP sweep, port scanning, etc.

Wrong Packet Attack: Ping of Death, Teardrop, etc.

Special Packet Attack: Outsize ICMP, Tracert, IP time stamp option packet, etc.

Each type of network attack has inherent network action and packet/flow characteristics. Accordingly, there is a special security function giving a notice to a capability set for detection and mitigation in each type of attack. Implementation and a management attack mitigation control function in this range may be very similar to a contents security control range.

Information Sub-Model for Network Security Capabilities

The object of a capability information sub-model is to define the concept of a capability and enable capabilities to be aggregated in an appropriate object. Hereafter, a sub-model with a network security, contents security, and attack mitigation function is described.

Information Sub-Model for Network Security

FIG. 4 shows an example of a network security information sub-model summary to which the present disclosure can be applied.

The object of a network security information sub-model is to define a method of defining a network traffic and to determine whether to apply one or more network security function to a traffic.

In FIG. 4, an ECA policy rule is defined in the external ECA information model together with event, condition, and action objects. The network security sub-model may extend these all objects to define extension for a security-related ECA policy rule, and (generic) event, condition, and action objects.

The I2NSF policy rule is a special type of policy rule of an event condition action (ECA) type. It may be composed of a policy rule, components of the policy rule (e.g., an event, a condition, a work and resolution policy, basic work, and some extenders such as external data), and selectively metadata, and may be applied to both of unidirectional and bidirectional traffics through an NSF.

Network Security Policy Rule Extensions

FIG. 5 shows an example of extension of a network security information sub-model to which the present disclosure can be applied.

FIG. 5 shows an example of a more detailed design of an ECA policy rule sub-class included in the network security information sub-model. This shows a method in which more detailed network security policies is transferred and extended in a SecurityECAPolicyRule class.

According to the following pattern of class design, it is possible to create a new kind o specific network security policy.

SecurityECAPolicyRule is positioned at the uppermost portion of an I2NSF ECA policy rule layer. This rule is transferred from a (external) generic ECA policy rule and shows specification of such a generic ECA policy rule for adding a security-related ECA policy rule.

The SecurityECAPolicyRule includes all properties, methods, and relationships defined in a super class and adds an additional concept required for network security.

Six SecurityECAPolicyRule sub-classes show six types of Network Security ECA Policy Rules by extending the SecurityECAPolicyRule class. The (external) generic ECAPolicyRule class may define not only explanation and other required information, but basic information in the type of property such as an inherent object ID.

Network Security Policy Rule Operation

A network security policy is composed of one or more ECA policy rules composed of the information models described above. In a simple case in which event and condition clauses are not changed, work of one policy rule may call out additional network security work from another policy rule. The network security policy examines a traffic and performs basic processing as follows.

1. An NSF evaluates an event clause of given SecurityECAPolicyRule (which may be general or specific for security as shown in FIG. 3). The entire or a portion of evaluation to be described below may be performed using a security event object.

When an event clause is evaluated as TRUE, the condition clause of SecurityECAPolicyRule is evaluated. If not so, execution of SecurityECAPolicyRule may be stopped and the next SecurityECAPolicyRule may be evaluated.

2) Thereafter, a condition clause may be evaluated. The entire or a portion of evaluation to be described below may be performed using a security requirement object. When a condition clause is evaluated as TRUE, it is defined as "coinciding" with SecurityECAPolicyRule If not so, execution of SecurityECAPolicyRule may be stopped and the next SecurityECAPolicyRule may be evaluated.

3) A series of work to be executed is searched and a resolution strategy is used to define the execution order. Selective external data use related to SecurityECAPolicyRule may be included in the process in Step 3.

4) Execution may take one of the following three types.

a. When one or more behavior is selected, an NSF may perform a behavior defined by a resolution strategy. For example, the resolution strategy may allow only a single action (e.g., FMR or LMR) to be executed or may allow all actions to be executed (selectively or in specific order).

An a case different from this case, the NSF function should clearly determine an execution method.

The entire or a portion of execution to be described below may be performed using a security action object. When a basic action is permission or a mirror, an NSF first performs a corresponding function and then checks whether a specific security function is referred to in a rule. If it is "Yes", it moves to Step 5. When it is No, a traffic is allowed.

b. When there is no selected action and there is a basic action, the basic action may be performed. If not so, no work is performed.

c. If not so, a traffic may be rejected.

5. When another security function (e.g., a condition and/or an action suggested by a virus vaccine or an IPS profile NSF) is referred to in an action set of SecurityECAPolicyRule, an NSF may be configured to use the referred security function (e.g., check condition or behavior execution).

Thereafter, execution may be ended.

Network Security Event Sub-Model

FIG. 6 shows an example of extension a network security information sub-model event class to which the present disclosure can be applied.

FIG. 6 shows an example of a design of an event sub-class included in a network security information sub-model.

Four event classes of FIG. 6 show important events in network security by extending a (external) generic event class. It may be assumed that the (external) generic event class defines basic event information of a property form such as an inherent event ID, and a date and a time when explanation and an event have occurred.

Network Security Condition Sub-Model

FIG. 7 shows an example of extension a network security information low-model condition class to which the present disclosure can be applied.

FIG. 7 shows a more detailed design of a condition sub-class included in a network security information sub-model.

Six condition classes shown in FIG. 7 show conditions related to network security by extending a (external) generic condition class. The (external) generic condition class is abstract, so it is assumed that data model optimization may be defined.

It is assumed that the generic condition class defines basic condition information in the form of property such as a mechanism connecting an inherent object ID, explanation, and 0 or more metadata objects.

Network Security Action Sub-Model

FIG. 8 shows an example of extension of a network security information sub-model action to which the present disclosure can be applied.

FIG. 8 shows a more detailed design of a measure sub-class included in a network security information sub-model. Four action classes of FIG. 8 show work performing a network security control function by extending a (external) generic action class.

Three action classes of FIG. 8 show work related to network security by extending a (external) generic action class. The (external) generic condition class is abstract, so data model optimization may be defined.

It is assumed that the generic action class defines basic action information in the form of property such as a mechanism adding an inherent object ID, explanation, and 0 or more metadata objects.

Information Model for I2NSF Capabilities

FIG. 9 shows an example of a high-level model of an I2NSF security function to which the present disclosure can be applied.

As shown in FIG. 9, an I2NSF function model is composed of many functions showing various contents security and attack mitigation functions. Each function is protected from a thread of a specific type in an application program layer.

FIG. 9 shows a generic I2NSF security function class called SecurityCapability. Accordingly, it is possible to add a common property, a relationship, and an action to the class without influencing the design of the external metadata information model. All I2NSF security functions are sub-classed in SecurityCapability class.

Information Model for Content Security Capabilities

FIG. 10 shows an example of extension of a network security function information model to which the present disclosure can be applied.

FIG. 10 shows exemplary types of contents security GNSF (Generic Network Security Function).

As shown in FIG. 10, contents security may be composed of various inherent security functions. Each of such capabilities may protect contents from a specific type of threat in an application program layer.

Contents security, as shown in FIG. 10, may be a GNSF (Generic Network Security Function).

Information Model for Attack Mitigation Capabilities

FIG. 11 shows an example of extension of an attack mitigation function information model to which the present disclosure can be applied.

As shown in FIG. 11, attach mitigation may be composed of several GNSFs. Each may protect contents from a specific type of network attack. Acknowledge mitigation security is a GNSF type summarizing a well-defined security function.

Structure and Object of I2NSF Security Policy

1. I2NSF Security Policy Rule

An I2NSF security policy rule shows a policy rule about a general network security function. An object of the policy rule may be defined as policy information and rule information. ECA policy rules such as Event Clause Objects, Condition Clause Objects, Action Clause Objects, Resolution Strategy, and Default Action may be included therein.

2. Event Clause

An event, as described above, may occur when a system that is managed is changed and/or at an important point in time in the environment of the system that is managed.

Event clause objects may be used to determine whether it is possible to estimate a condition clause of the I2NSF when being used in a context of the I2NSF policy rule. The target of an event clause may be defined as a user security event, a device security event, a system security event, and a time security event. The target of an event article may be extended in accordance with a specific vendor event function.

3. Condition Clause

A condition, as described above, is defined as a set of a property, a function, and/or a value to be compared with a set of a known property, feature, and/or value, and may execute or may not execute the (imperative) I2NSF policy rule.

Such an object may be defined as a packet security condition, a packet payload security condition, a target security condition, a user security condition, a context condition, and a generic context condition.

The target of an action article may be extended in accordance with a specific vendor condition function.

4. Action Clause

An action is used to control and monitor the side of a flow-based NSF when event and condition clauses are satisfied. An NSF provides a security function by executing various actions. The object of an action clause may be defined as an input action, a transmission action, and an application profile action, and the object of the action clause may be extended in accordance with a specific vendor measure function.

Data Model Architecture

Hereafter, a data model proposed in the present disclosure is described.

The followings are considered in the architecture of a data model proposed in the present disclosure.

Consideration of ECA Policy Model by Event, Condition, Action Clause Aggregation Consideration of Capability Logarithm Consideration of NSF Function Category (e.g., Network Security, Contents Security, and Attack Mitigation Function)

Definition for a network security event class, a network security condition class, and a network security work class.

FIG. 12 illustrates capabilities of NSF in an I2NSF Framework according to an embodiment of the present disclosure.

Referring to FIG. 12, the NSF developer's Network Operator Management (MGMT) system may register capabilities (e.g. firewall and web filters) that NSF and network security devices can support. The developer's management system utilizes a YANG data model of this standardized capability through the I2NSF registration interface to register the NSF in this way. That is, such a registration interface may use the YANG module described in the present disclosure to describe the function of the network security function registered in the security controller. The security device may be easily managed by maintaining the capabilities of this network security device centrally.

Referring to FIG. 12, the new NSF in the developer's management system may support Event-Condition-Action (ETA) policy rules that mean functions of firewall (FW) and web filter (WF) indicated by (Cap={FW, WF}), and 'E', 'C', 'A', 'Event', 'Condition', 'Action', respectively.

The NSF-facing interface may be used to configure security policy rules of general network security capabilities [draft-ietf-i2nsf-nsf-nsf-face-dm], and the configurations of advanced security functions through the NSF-facing interface each may be used to configure security policy rules for advanced network security [draft-dong-i2nsf-asf-config] depending on the capabilities of the NSF registered in the I2NSF framework. The use case of the NSF with firewall and web filter functions may be described as follows.

When a network administrator applies a security policy rule to block malicious users using a firewall and a web filter, applying all necessary rules to the NSF one by one may be a huge burden for the network administrator. This problem may be solved by managing the capabilities of the NSF.

For example, if the network administrator wants to block a malicious user with IPv6, the network administrator may transmit a security policy rule that blocks the user to the management system using the I2NSF user web application.

Upon receiving the security policy rule, the network operator management system may automatically transmit the security policy rules to the appropriate NSF (that is, NSF-m in developer's management system A and NSF-1 in developer's management system B) to support the necessary capabilities (i.e. IPv6). Therefore, the I2NSF users do not need to consider the NSF to which the rules apply.

If the NSF encounters a malicious packet, it may be an enormous burden for the network administrator to apply a rule to block the malicious packet one by one to the NSF. These problems may be solved by managing the capabilities of the NSF.

For example, when the NSF finds suspicious IPv4 packets, it can filter these packets as configured. Through this, a new security policy rule for blocking malicious packets may be applied to an appropriate NSF without human intervention.

FIG. 13 illustrates a YANG data model structure for capabilities of the NSF according to an embodiment of the present disclosure.

Referring to FIG. 13, the YANG data models include the capabilities of the NSF. The capabilities of the NSF include a time capability, an event capability, a condition capability, an action capability, a resolution strategy capability and a default action capability.

These capabilities may be customized or extended according to vendor's specific requirements. For more information, the NSF functional information model [draft-ietf-i2nsf-capability] may be referred to.

The time capability is used to indicate the capability to indicate when to execute the I2NSF policy rule. The time capability is defined in terms of an absolute time and a periodic time. The absolute time means an exact time of start or end. The periodic time means a repeated time such as day, week or month.

The event capability is used to describe an event for triggering an evaluation of a condition of the I2NSF policy rule.

The event capability defined in this manner is defined as system events and system alarms. The event capability may be expanded according to specific vendor's condition capabilities. The event capability is detailed in [draf-ietf-i2nsf-capability].

The condition capability is used to specify properties known to determine whether a set of actions related to the corresponding (expressed) I2NSF policy rule can be executed, properties to compare to a set of features and/or values, capabilities of a set of features and/or values. The condition capability is classified into a general network security capability and an advanced network security capability.

For the general network security capability, the condition capability may be defined as an IPv4 capability, an IPv6 capability, a TCP capability, a UDP capability, an ICMP capability. The state capability of the advanced network security capability may be defined as anti-virus capability, an anti-ddos capability, an IPS capability, an HTTP capability, and a VoIP/VoLTE capability. The condition capability may be expanded according to the specific vendor's condition capabilities. The condition capability is detailed in [draf-ietf-i2nsf-capability].

The action capability is used to describe a capability of a method for controlling and monitoring aspects of a flow-based NSF when events and conditions are met. The action capability may be defined as a reception action capability, a transmission action capability, and a log action capability.

The resolution strategy capability is used to specify a method for resolving conflicts that occurs when a specific NSF is matched or between the actions of the same or different policy rules included in a specific NSF. The resolution strategy capability may be defined as First Matching Rule (FMR), Last Matching Rule (LMR), Priority Matching Rule (PMR), Priority Matching Rule (PMR) and Priority Matching Rule with Errors (PMRN). The resolution strategy capability may be expanded according to the specific vendor's action ability capabilities. The resolution strategy capability is detailed in [draf-ietf-i2nsf-capability].

When there is no rule matching the received packet, the default action capability is used to specify a method for executing the I2NSF policy rule. The default action capability may be defined as pass, drop, reject, warning and mirror.

An IPsec method capability is used to specify a capability of an internet key exchange (IKE) support method for security communication. The default action capability may be defined as IKE and IKE-less.

FIGS. 14a to 15d illustrate a YANG data model of a network security function capability that can be applied in the present disclosure.

Referring to FIGS. 14a to 15d, the above-described YANG data model may be implemented.

The YANG model in the present disclosure may define a data schema designed to access through a network management protocol such as NETCONF [RFC6241] or RESTCON [RFC8040]. The lowest NETCONF layer is a security transport layer, and a required security transport layer may be Secure Shell (SSH) [RFC6242]. In addition, the lowest RESCONF layer is HTTPS, and the required transport security transport may be TLS [RFC8446].

The NETCONF access control model [RFC8341] may provide a method for limiting access to specific NETCONF or RESTCON users with a pre-configured subset of all available NETCONF or RESTCON protocol operations and content.

In this YANG module, a writable/createable/deletable data node is defined (that is, a true setting (default)). These data nodes may be considered sensitive or vulnerable in some network environments. Thus, without proper protection, write actions (e.g. edit-configuration) to these data nodes may negatively affect network action (e.g. subtrees and data nodes, sensitivity/vulnerability).

The data models described in FIGS. 1 to 15D described above may be selectively combined and used.

FIG. 16 is an embodiment to which the present disclosure can be applied.

Referring to FIG. 16, the security controller may be included in a network operation management system. This is an embodiment of the security controller.

From a developer's management system, a procedure for registering the capabilities of the NSF is performed (S1610). More specifically, the capabilities of the NSF may include a time capability, an event capability, a condition capability, an action capability, a resolution strategy capability and a default action capability.

A security policy rule is received from an interface to network security function (I2NSF) user (S1620). For example, the capabilities of the NSF may be registered in a management table in memory managed by the security controller. For this, the YANG model described above may be used.

The security policy rule is transmitted to be supported by the capabilities of the NSF to an NSF that can be used for the security policy rule based on the registered capabilities of the NSF (S1630).

There may be a plurality of such developer's management systems, and the developer's management system may support a plurality of NSFs. Also, a plurality of NSFs supported by the security controller may be provided.

Accordingly, the security controller may determine an order of the actions of the security policy rule related to the NSF based on the resolution strategy capability when the conflict of actions of the security policy rule related to the supported NSF occurs.

If there is no determined order of the actions, the security controller may perform an action based on the default action capability.

FIG. 17 shows the configuration XML for capabilities registration of general firewall and its capabilities are as follows.

1. The name of the NSF is general_firewall.
2. The NSF can inspect protocol, exact IPv4 address, and range IPv4 address for IPv4 packets.
3. The NSF can inspect exact port number and range port number for fourth layer packets.
4. The NSF can control whether the packets are allowed to pass, drop, or alert.

FIG. 18 shows the configuration XML for capabilities registration of time based firewall and its capabilities are as follows.

1. The name of the NSF is time_based_firewall.
2. The NSF can execute the security policy rule according to absolute time and periodic time.
3. The NSF can inspect protocol, exact IPv4 address, and range IPv4 address for IPv4 packets.
4. The NSF can control whether the packets are allowed to pass, drop, or alert.

FIG. 19 shows the configuration XML for capabilities registration of web filter and its capabilities are as follows.

1. The name of the NSF is web_filter.
2. The NSF can inspect url for http and https packets.
3. The NSF can control whether the packets are allowed to pass, drop, or alert.

FIG. 20 shows the configuration XML for capabilities registration of VoIP/VoLTE filter and its capabilities are as follows.

1. The name of the NSF is voip_volte_filter.
2. The NSF can inspect voice id for VoIP/VoLTE packets.
3. The NSF can control whether the packets are allowed to pass, drop, or alert.

FIG. 21 shows the configuration XML for capabilities registration of http and https flood mitigation and its capabilities are as follows.

1. The name of the NSF is http_and_https_flood_mitigation.
2. The location of the NSF is 221.159.112.140.

3. The NSF can control the amount of packets for http and https packets.

4. The NSF can control whether the packets are allowed to pass, drop, or alert.

The embodiments described above are predetermined combinations of the components and the features of the present disclosure. Each component or feature, unless specifically stated, should be considered as being selective. Each component or feature may be implemented in a type in which they are not combined with other components or features. Further, embodiments of the present disclosure may be configured by combining some components and/or features. The order of the actions described in embodiments of the present disclosure may be changed. Some components or features of any embodiment may be included in another embodiment and may be replaced with corresponding configurations and features of another embodiment. Unless specifically referred in claims, it is apparent that an embodiment may be configured by combining claims or new claims may be included through amendment after application.

Embodiments of the present disclosure may be implemented by various measures, such as hardware, firmware, software, or combinations thereof. When hardware is used, an embodiment of the present disclosure may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a processor, a controller, a micro controller, and a micro processor.

In the case of an implementation by firmware or software, the embodiments described in the present disclosure may be implemented in the form of a module, a procedure, or a function for performing the capabilities or actions described above. The software code may be stored in a memory and driven by the processor. The memory may be located inside or outside the processor, and may exchange data with the processor by various well-known means.

It is apparent to those skilled in the art that the present disclosure can be embodied in other specific types within a range not departing from the necessary characteristics of the present disclosure. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

INDUSTRIAL APPLICABILITY

The present disclosure may be applied to various security management systems.

What is claimed is:

1. A processor-implemented method for managing capabilities of network security functions (NSFs), the method performed by a security controller in a security management system; comprising:
   performing, by one or more processors, a procedure for registering capabilities of the NSFs, from a developer's management system;
   receiving, by the one or more processors and using a first network interface, a first-level security policy rule from an interface to network security function (I2NSF) user;
   translating, by the one or more processors, the first-level security policy rule into a second-level security policy rule that is related to the registered capabilities of the NSFs; and
   transmitting, by the one or more processors and using a second network interface, the second-level security policy rule to at least one NSF that is selected to process the second-level security policy rule.

2. The method of claim 1, wherein the capabilities of the NSFs include a time capability, an event capability, a condition capability, an action capability, a resolution strategy capability and a default action capability.

3. The method of claim 2, wherein the time capability indicates when to evaluate the second-level security policy rule related to the NSFs, and includes an absolute time value or a periodic time value.

4. The method of claim 2, wherein the event capability is for triggering an evaluation of a condition of the second-level security policy rule related to the NSFs.

5. The method of claim 2, wherein the condition capability is for determining whether to perform an action of the second-level security policy rule related to the NSFs.

6. The method of claim 2, wherein the action capability is for indicating an action method of the NSFs when events and conditions of the second-level security policy rule related to the NSFs are satisfied.

7. The method of claim 2, wherein when a conflict of actions of the second-level security policy rule related to the NSFs occurs, the resolution strategy capability is for resolving the conflict.

8. The method of claim 7, further comprising:
   determining an order of the actions of the second-level security policy rule related to the NSFs based on the resolution strategy capability when the conflict of actions of the second-level security policy rule related to the NSFs occurs.

9. The method of claim 8, further comprising:
   performing an action based on the default action capability if there is no determined order of the actions.

10. The method of claim 2, wherein the default action capability indicates an action that can be performed when the NSFs that can be used for the second-level security policy rule is not searched.

11. A security management system for managing capabilities of network security functions (NSFs), comprising:
   a developer's management system configured to register capabilities of the NSFs to a security controller;
   an interface to network security function (I2NSF) user configured to provide a first-level security policy rule for applying to the security management system to the security controller; and
   the security controller configured to:
      perform a procedure for registering capabilities of the NSFs from the developer's management system;
      receive, using a first network interface, the first-level security policy rule from the I2NSF user;
      translate the first-level security policy rule into a second-level security policy rule that is related to the registered capabilities of the NSFs; and
      transmit, using a second network interface, the second-level security policy rule to at least one NSF that is selected to process the second-level security policy rule.

12. The security management system of claim 11, wherein the capabilities of the NSFs include a time capability, an event capability, a condition capability, an action capability, a resolution strategy capability and a default action capability.

13. The security management system of claim 12, wherein the time capability indicates when to evaluate the second-level security policy rule related to the NSFs, and includes an absolute time value or a periodic time value.

14. The security management system of claim 12, wherein the event capability is for triggering an evaluation of a condition of the second-level security policy rule related to the NSFs.

15. The security management system of claim 12, wherein the condition capability is for determining whether to perform an action of the second-level security policy rule related to the NSFs.

16. The security management system of claim 12, wherein the action capability is for indicating an action method of the NSFs when events and conditions of the second-level security policy rule related to the NSFs are satisfied.

17. The security management system of claim 12, wherein when a conflict of actions of the second-level security policy rule related to the NSFs occurs, the resolution strategy capability is for resolving the conflict.

18. The security management system of claim 17, wherein the security controller determines an order of the actions of the second-level security policy rule related to the NSFs based on the resolution strategy capability when the conflict of actions of the second-level security policy rule related to the NSFs occurs.

19. The security management system of claim 18, wherein the security management system performs an action based on the default action capability if there is no determined order of the actions.

20. The security management system of claim 12, wherein the default action capability indicates an action that can be performed when the NSFs that can be used for the second-level security policy rule is not searched.

* * * * *